United States Patent
Tanaka

(10) Patent No.: US 9,201,553 B2
(45) Date of Patent: Dec. 1, 2015

(54) TOUCH DETECTION DEVICE, DISPLAY DEVICE WITH TOUCH DETECTION FUNCTION, AND ELECTRONIC APPARATUS

(71) Applicant: Japan Display Inc., Tokyo (JP)

(72) Inventor: Toshihiko Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 25 days.

(21) Appl. No.: 14/282,641

(22) Filed: May 20, 2014

(65) Prior Publication Data

US 2014/0347317 A1 Nov. 27, 2014

(30) Foreign Application Priority Data

May 27, 2013 (JP) ................................. 2013-111352

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0416* (2013.01); *G06F 2203/04101* (2013.01)

(58) Field of Classification Search
CPC ........ G06F 3/041–3/04897; G06F 2203/04101
See application file for complete search history.

(56) References Cited

U.S. PATENT DOCUMENTS

| | | | | |
|---|---|---|---|---|
| 5,374,787 A | * | 12/1994 | Miller et al. | 178/18.06 |
| 5,463,388 A | * | 10/1995 | Boie et al. | 341/33 |
| 5,880,411 A | * | 3/1999 | Gillespie et al. | 178/18.01 |
| 6,323,846 B1 | * | 11/2001 | Westerman et al. | 345/173 |
| 7,911,456 B2 | * | 3/2011 | Gillespie et al. | 345/174 |
| 8,164,577 B2 | * | 4/2012 | Tsuzaki et al. | 345/173 |
| 8,237,678 B2 | | 8/2012 | Narita | |
| 8,330,474 B2 | * | 12/2012 | Vandermeijden | 324/658 |
| 9,098,138 B2 | * | 8/2015 | King et al. | 1/1 |
| 9,098,142 B2 | * | 8/2015 | Westerman et al. | 1/1 |
| 2002/0000977 A1 | * | 1/2002 | Vranish | 345/173 |
| 2008/0048997 A1 | * | 2/2008 | Gillespie et al. | 345/174 |
| 2009/0122007 A1 | * | 5/2009 | Tsuzaki et al. | 345/156 |
| 2010/0090712 A1 | * | 4/2010 | Vandermeijden | 324/658 |
| 2011/0041098 A1 | * | 2/2011 | Kajiya et al. | 715/849 |
| 2011/0095997 A1 | * | 4/2011 | Philipp | 345/173 |
| 2012/0038584 A1 | * | 2/2012 | Liu | 345/174 |
| 2012/0050258 A1 | * | 3/2012 | Kay et al. | 345/419 |
| 2014/0028607 A1 | * | 1/2014 | Tan et al. | 345/174 |
| 2014/0184565 A1 | * | 7/2014 | Yeh | 345/174 |
| 2015/0084930 A1 | * | 3/2015 | Watanabe et al. | 345/175 |

FOREIGN PATENT DOCUMENTS

JP 2009-116769 5/2009
JP 2010-055510 3/2010

* cited by examiner

*Primary Examiner* — Gene W Lee
(74) *Attorney, Agent, or Firm* — K&L Gates LLP

(57) ABSTRACT

According to an aspect, a display device with a touch detection function, during a touch detection operation, derives a signal value based on the touch detection signal at coordinates at which the pointer is in contact with or in proximity to the device and in the vicinity of the coordinates; derives a three-dimensional waveform which employs a magnitude of the signal value as a height direction; derives a straight line in the three-dimensional waveform, the straight line connecting between a barycenter based on a volume of a three-dimensional waveform portion equal to or greater than a first threshold value in the height direction and a barycenter based on a volume of a three-dimensional waveform portion equal to or greater than a second threshold value in the height direction; and detects based on the straight line whether the pointer is in contact with or in proximity to the device.

13 Claims, 24 Drawing Sheets

FIG.19
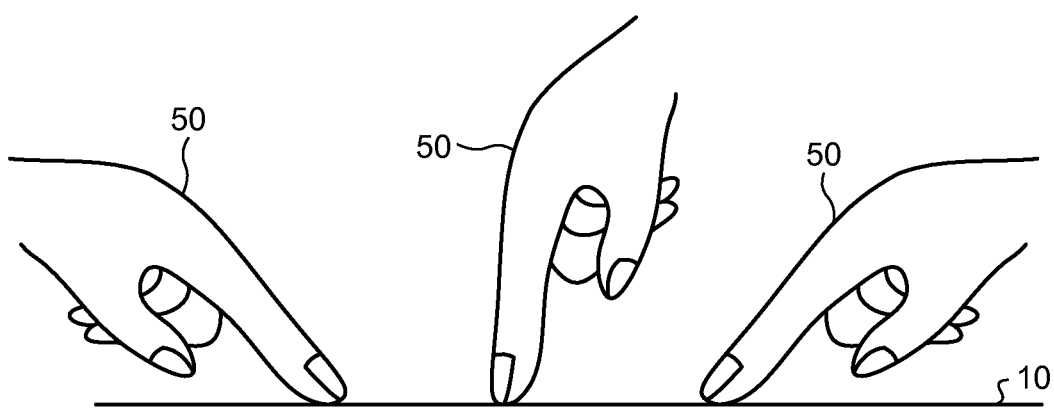
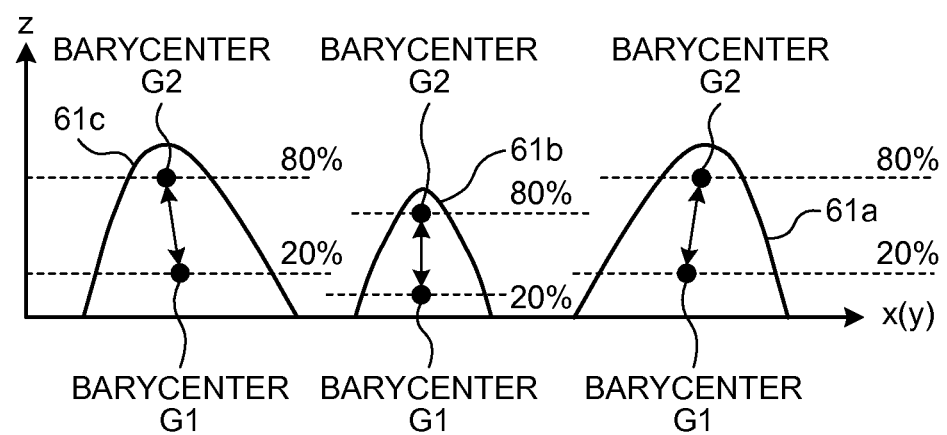

512 GLASS FILTER
510 VIDEO DISPLAY SCREEN
511 FRONT PANEL

SHUTTER BUTTON
524

LIGHT-EMITTING PART
521

DISPLAY SECTION 543
KEYBOARD 542
MAIN BODY 541

UPPER HOUSING 551
DISPLAY 554
LOWER HOUSING 552

UPPER HOUSING
551

552
LOWER HOUSING

552
LOWER HOUSING

551
UPPER HOUSING

LOWER HOUSING
552

553
COUPLING PART

551
UPPER HOUSING

UPPER HOUSING
551

552
LOWER HOUSING

TOUCH DETECTION DEVICE, DISPLAY DEVICE WITH TOUCH DETECTION FUNCTION, AND ELECTRONIC APPARATUS

CROSS REFERENCES TO RELATED APPLICATIONS

The present application claims priority to Japanese Priority Patent Application JP 2013-111352 filed in the Japan Patent Office on May 27, 2013, the entire content of which is hereby incorporated by reference.

BACKGROUND

1. Technical Field

The present disclosure relates to a touch detection device, a display device with a touch detection function, and an electronic apparatus which enable an external approaching object to be detected in response to a change in capacitance.

2. Description of the Related Art

In recent years, attention has been focused on a display device with a touch detection function which has a touch detection device or a so-called touch panel provided on a display device such as a liquid crystal display device or which has a touch detection device and a display device integrated with each other. On the display device are displayed various types of button images or the like to replace typical mechanical buttons, thereby enabling entry of information. The display device having such a touch panel requires no input devices like a keyboard, a mouse, or key pads, and thus has been extensively used, for example, with personal digital assistants like mobile telephones in addition to computers.

There are several touch detection operation systems such as of the optical and resistive types; however, in particular, for example, portable terminals tend to employ the capacitive type which provides a relatively simple structure and requires lower power consumption. In the capacitive touch detection device, capacitance is formed between drive electrodes to which a drive signal is applied. The capacitive touch detection device detects whether there is a touch or not by detecting a change in capacitance caused by an external object being brought into contact with or proximity to the device, that is, a change in voltage waveform that appears on the touch detection electrodes.

Some of such capacitive touch detection devices are provided with two fixed threshold values in order to produce three values by comparing these threshold values with a detected change in capacitance, thereby calculating a first region in which a change in capacitance equal to or greater than the higher threshold value is detected and a second region in which a change in capacitance equal to or greater than the lower threshold value and less than the higher threshold value is detected (see Japanese Patent Application Laid-Open Publication No. 2010-55510 (JP-A-2010-55510)). Further, the touch detection device disclosed in JP-A-2010-55510 determines a point as the one at which a user intended to be in contact with or in close proximity to the panel surface, the point being offset by a predetermined amount from the area barycenter of the first region on a straight line connecting between the area barycenter of the first region and the area barycenter of the second region. As described above, the touch detection device disclosed in JP-A-2010-55510 attempts to approximate to the contact point or proximity point intended by a user on the panel surface using the area barycenters of the two regions obtained by the threshold determination process.

However, the touch detection device disclosed in JP-A-2010-55510 deals with three groups of values by two threshold values and only classifies detected signals into the first region and the second region; that is, it is only determined to which of the two regions the level of a signal at each point on the touch surface belongs. Thus, in the touch detection device that employs a method for determining a touch point on the panel surface based on the area barycenter of such a region, there is a possibility that a difference between the determined touch point and the contact point or proximity point intended by a user occurs, thus possibly preventing improvement in the control accuracy by a user.

For the foregoing reasons, there is a need for a touch detection device, a display device with a touch detection function, and an electronic apparatus which can improve the accuracy of control by a user's touch operation on the screen.

SUMMARY

According to an aspect, a display device with a touch detection function includes: a plurality of touch detection electrodes; a plurality of drive electrodes opposed to the touch detection electrodes and forming capacitance between the drive electrodes and the touch detection electrodes; an operation drive unit for applying a touch detection drive signal to the drive electrodes during a touch detection operation to detect whether a pointer is in contact with or in proximity to the device; and a touch detection unit for detecting a touch detection signal appearing on the touch detection electrodes by the touch detection drive signal. When the pointer is detected to be in contact with or in proximity to the device during the touch detection operation carried out based on the touch detection signal detected from the touch detection electrodes, the touch detection unit derives a signal value based on the touch detection signal at coordinates at which the pointer is in contact with or in proximity to the device and in the vicinity of the coordinates; derives a three-dimensional waveform which employs a magnitude of the signal value as a height direction; derives a straight line in the three-dimensional waveform, the straight line connecting between a barycenter based on a volume of a three-dimensional waveform portion equal to or greater than a first threshold value in the height direction and a barycenter based on a volume of a three-dimensional waveform portion equal to or greater than a second threshold value different from the first threshold value in the height direction; and detects based on the straight line whether the pointer is in contact with or in proximity to the device.

According to another aspect, a display device with a touch detection function includes: the touch detection device; a plurality of pixel electrodes to which a pixel signal is applied for a pixel to perform a display operation; a display drive unit for applying the pixel signal to the pixel electrodes so as to carry out the display operation; and a control unit for controlling the operation drive unit and the display drive unit. During the display operation, the operation drive unit applies a display drive signal in synchronization with the pixel signal to the drive electrodes.

According to another aspect, an electronic apparatus includes the display device with a touch detection function; and a controller for carrying out processing associated with control detected by the display device with a touch detection function and supplying a video signal to the display device with a touch detection function.

Additional features and advantages are described herein, and will be apparent from the following Detailed Description and the figures.

BRIEF DESCRIPTION OF THE FIGURES

FIG. 19 is a view illustrating three-dimensional waveforms detected corresponding to the angle of each axial direction of a finger when the finger is in contact with or in close proximity to the display unit with a touch detection function according to the first embodiment of the present disclosure;

DETAILED DESCRIPTION

Now, with reference to the drawings, a description will be made to the embodiments of the present disclosure in more detail in the following order.
1. First embodiment
2. Second embodiment
3. Aspects of present disclosure 1. First Embodiment Entire Configuration of the Display Device with a Touch Detection Function 1

Figure 1:
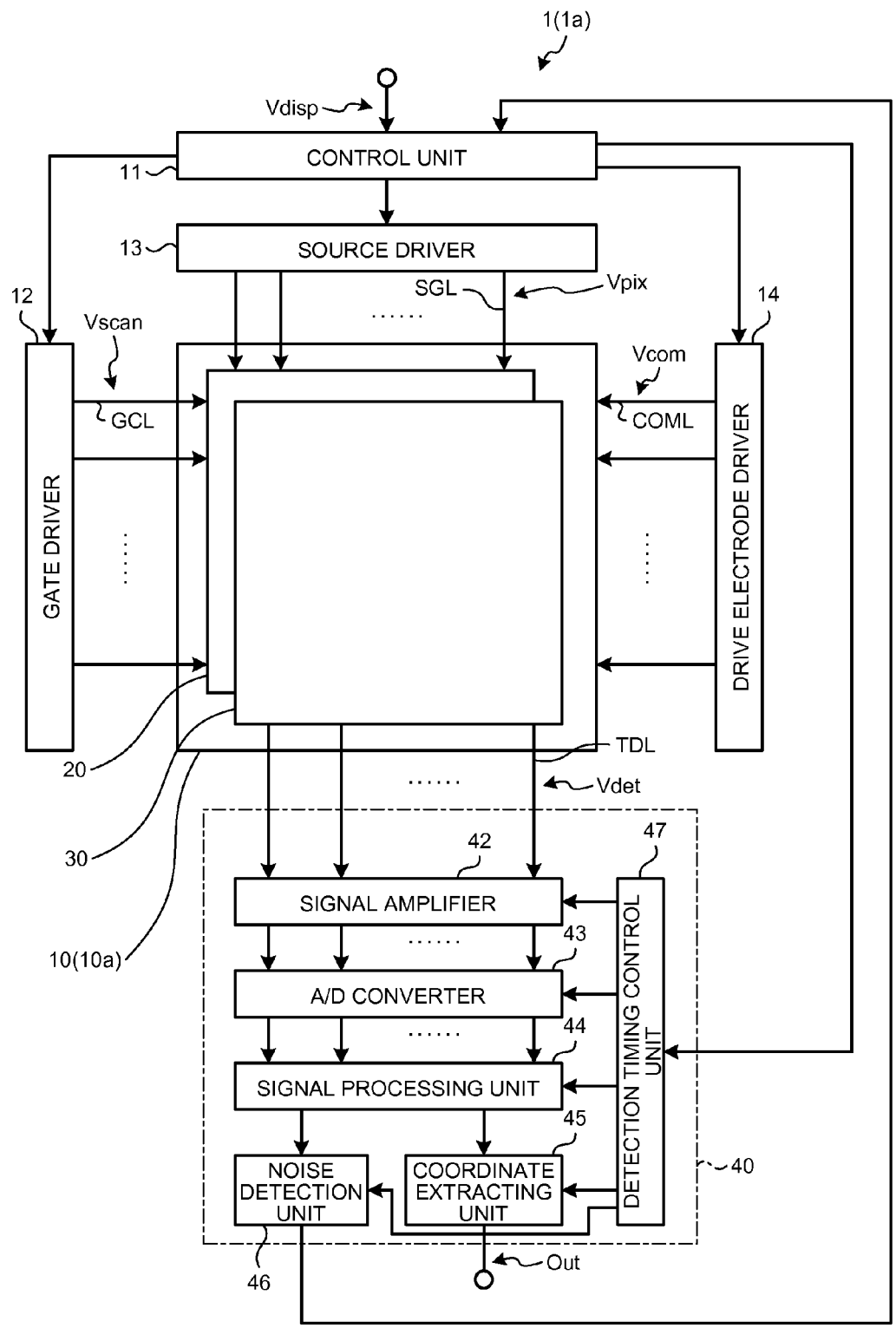
FIG. 1 is a block diagram illustrating a configuration example of a display device with a touch detection function according to a first embodiment of the present disclosure.

FIG. 1 is a block diagram illustrating a configuration example of a display device with a touch detection function according to a first embodiment of the present disclosure. Now, with reference to FIG. 1, a description will be made to the entire configuration of the display device with a touch detection function 1 according to the present embodiment. The display device with a touch detection function 1 illustrated in FIG. 1, which employs liquid crystal display pixels as the display pixels thereof, is a so-called in-cell type device in which a liquid crystal display unit 20 including the liquid crystal display pixels and a capacitive touch detection device 30 are integrated.

As illustrated in FIG. 1, the display device with a touch detection function 1 according to the present embodiment includes a display unit with a touch detection function 10, a control unit 11, a gate driver 12, a source driver 13 (display drive unit), a drive electrode driver 14 (operation drive unit), and a touch detection unit 40.

The display unit with a touch detection function 10 is a display device which includes a touch detection function. The display unit with a touch detection function 10 has the liquid crystal display unit 20 and the touch detection device 30.

As will be described later, the liquid crystal display unit 20 displays by sequentially scanning horizontal lines one by one according to a scanning signal Scan outputted from the gate driver 12. As will be described later, the touch detection device 30 performs a touch detection operation by sequential block-by-block scanning according to a touch detection drive signal Vcomt outputted from the drive electrode driver 14. The touch detection device 30 outputs a touch detection signal Vdet through a plurality of touch detection electrodes TDL block by block and then supplies the signal Vdet to the touch detection unit 40.

The control unit 11 outputs a control signal to each of the gate driver 12, the source driver 13, the drive electrode driver 14, and the touch detection unit 40 based on a video signal Vdisp supplied from outside to control so that these components operate in synchronization with each other.

The gate driver 12 functions to sequentially select one horizontal line to be displayed by the liquid crystal display unit 20 of the display unit with a touch detection function 10 based on the control signal outputted from the control unit 11. More specifically, the gate driver 12 applies the scanning signal Scan through scanning signal lines GCL to the gates of the TFT elements Tr of pixels Pix to be described later, thereby sequentially selecting one row (one horizontal line) of the pixels Pix as those to be displayed, the pixels Pix being formed in a matrix on the liquid crystal display unit 20 of the display unit with a touch detection function 10.

The source driver 13 outputs a pixel signal Vpix to each of the pixels Pix of the liquid crystal display unit 20 of the display unit with a touch detection function 10 based on the control signal outputted from the control unit 11. More specifically, the source driver 13 outputs the pixel signal Vpix through pixel signal lines SGL to each of the pixels Pix that constitute one horizontal line sequentially selected by the gate driver 12. Then, each of the pixels Pix constituting one horizontal line executes a display operation by receiving the pixel signal Vpix.

The drive electrode driver 14 outputs a drive signal Vcom to drive electrodes COML of the display unit with a touch detection function 10 based on the control signal outputted from the control unit 11.

Based on the control signal outputted from the control unit 11 and the touch detection signal Vdet outputted from the touch detection electrodes TDL of the touch detection device 30, the touch detection unit 40 detects during a touch detection period whether a pointer (for example, a finger or stylus) is in contact with or in close proximity to the touch detection device 30. When the pointer is detected to be in contact with or in close proximity to the device (hereafter simply referred to as touch detection), the touch detection unit 40 determines a signal value (to be described later) in a region where a touch is detected and the coordinates at which the pointer is considered to have touched the device. The touch detection unit 40 has a signal amplifier 42, an A/D converter 43, a signal processing unit 44, a coordinate extracting unit 45, a noise detection unit 46, and a detection timing control unit 47.

The signal amplifier 42 detects and amplifies the touch detection signal Vdet outputted through the touch detection electrodes TDL of the touch detection device 30. More specifically, the signal amplifier 42 integrates a current, which flows through the touch detection electrodes TDL, to be converted into a voltage signal, i.e., the touch detection signal Vdet. The signal amplifier 42 may also include a low-frequency band pass analog filter (also referred to as the "low-pass filter") for filtering out high frequency components (noise components) that are contained in the touch detection signal Vdet. It should be noted that the touch detection signal Vdet detected by the signal amplifier 42 does not always have to be amplified but may not be amplified if not required.

The A/D converter 43 samples, with appropriate timing, analog signals outputted from the signal amplifier 42 and then converts the resulting signal into a digital signal. For example, the A/D converter 43 may sample and convert analog signals outputted from the signal amplifier 42 into a digital signal during a touch detection period with timing in synchronization with the touch detection drive signal Vcomt or at a sampling frequency higher than the frequency of the timing. The touch detection unit 40 allows the A/D converter 43 to convert an analog signal outputted from the signal amplifier 42 into a digital signal; however, present embodiment is not limited thereto. That is, the touch detection unit 40 may also execute low pass digital filtering equivalent to the function of the signal amplifier 42 on the digital signal that has undergone A/D conversion equivalent to the function of the A/D converter 43.

The signal processing unit 44 determines during a touch detection period whether a touch is detected on the touch detection device 30 based on a signal outputted from the A/D converter 43, and outputs the signal supplied from the A/D converter 43 to the coordinate extracting unit 45.

As will be described later, when the signal processing unit 44 detects a touch during a touch detection period, the coordinate extracting unit 45 derives a signal value (to be described later) in a region where a touch is detected based on a signal supplied from the signal processing unit 44. Next, based on a three-dimensional waveform formed by the signal value, the coordinate extracting unit 45 derives the coordinates (target point) that are considered to be a contact point or proximity point intended by a user on the panel surface of the touch detection device 30 and derives the axial direction of the pointer. Then, the coordinate extracting unit 45 outputs the coordinate data of the derived target point and the axial data of the pointer as an output signal Out. An explanation will be made later to the operation of deriving the target point by the coordinate extracting unit 45 based on the three-dimensional waveform.

The noise detection unit 46 outputs a noise report signal to the control unit 11 when noise is contained in a signal outputted from the signal processing unit 44.

The detection timing control unit 47 controls so that each circuit constituting the touch detection unit 40 operates in synchronization with each other.

It should be noted that the component part that includes the touch detection electrodes TDL, the touch detection unit 40 for detecting the touch detection signal Vdet from the touch detection electrodes TDL, the drive electrodes COML, the drive electrode driver 14 for applying the touch detection drive signal Vcomt to the drive electrodes COML, and the control unit 11 corresponds to "the touch detection device" of the present disclosure.

Basic Principle of Capacitive Touch Detection Operation

Figure 2:
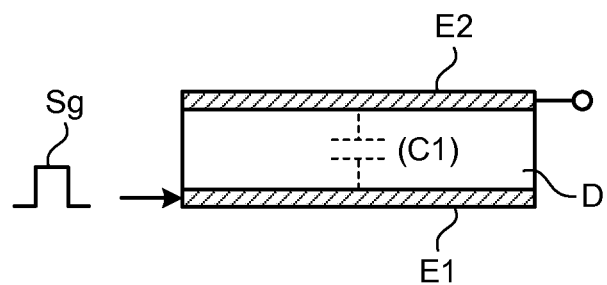
FIG. 2 is an explanatory view illustrating the basic principle of a capacitive touch detection operation with a finger neither in contact with nor in proximity to a device.
Figure 3:
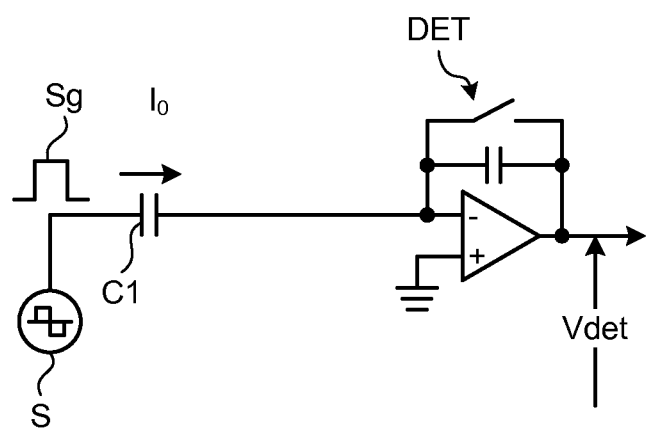
FIG. 3 is a view illustrating an equivalent circuit example corresponding to FIG. 2 with a finger neither in contact with nor in proximity to a device.
Figure 4:
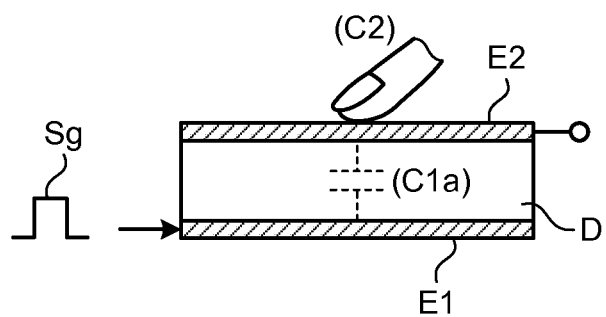
FIG. 4 is an explanatory view illustrating the basic principle of the capacitive touch detection operation with a finger in contact with or in proximity to a device.
Figure 5:
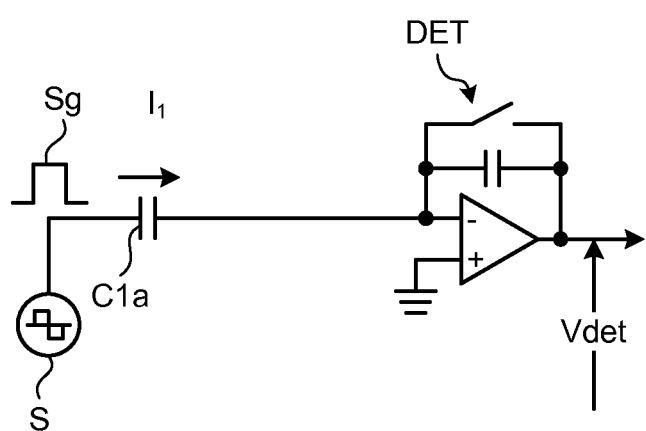
FIG. 5 is a view illustrating an equivalent circuit example corresponding to FIG. 4 with a finger in contact with or in proximity to a device.
Figure 6:
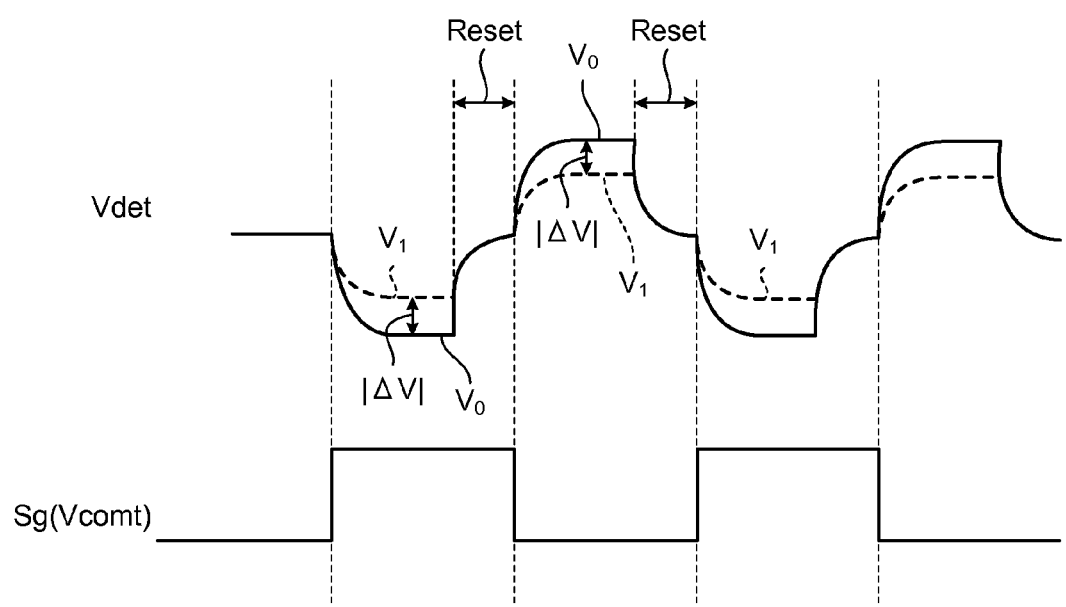
FIG. 6 is a view illustrating waveform examples of a drive signal and a touch detection signal with and without a pointer in contact with or in proximity to a device.

FIG. 2 is an explanatory view illustrating the basic principle of a capacitive touch detection operation with a finger neither in contact with nor in proximity to a device. FIG. 3 is a view illustrating an equivalent circuit example corresponding to FIG. 2 with a finger neither in contact with nor in proximity to a device. FIG. 4 is an explanatory view illustrating the basic principle of a capacitive touch detection operation with a finger in contact with or in proximity to a device. FIG. 5 is a view illustrating an equivalent circuit example corresponding to FIG. 4 with a finger in contact with or in proximity to a device. Further, FIG. 6 is a view illustrating waveform examples of the drive signal and the touch detection signal with and without a pointer in contact with or in proximity to a device. With reference to FIGS. 2 to 6, a description will be made to the basic principle of the touch detection operation on the display device with a touch detection function 1 of the present embodiment.

The system of the touch detection operation on the display device with a touch detection function 1 of the present embodiment is embodied by the capacitive type. For example, as illustrated in FIGS. 2 and 4, a capacitive element C1 includes a pair of electrodes (a drive electrode E1 and a touch detection electrode E2) which are disposed to face to each other with a dielectric D interposed therebetween. As illustrated in FIG. 3, the capacitive element C1 has one end coupled to an AC signal source S and the other end coupled to a voltage detector DET. For example, the voltage detector DET is an integration circuit which is included in the signal amplifier 42 illustrated in FIG. 1.

When an AC rectangular wave Sg at a predetermined frequency (for example, frequencies at about several kHz to several hundred kHz) is applied to the drive electrode E1 from the AC signal source S, the touch detection signal Vdet that is an output waveform illustrated in FIG. 6 is generated via the voltage detector DET coupled to the touch detection electrode E2. The AC rectangular wave Sg outputted from the AC signal source S corresponds to the touch detection drive signal Vcomt (to be described later) that the drive electrode driver 14 outputs. The drive electrode E1 corresponds to the drive electrode COML, while the touch detection electrode E2 corresponds to the touch detection electrodes TDL.

As illustrated in FIG. 2, with a finger neither in contact with nor in close proximity to the touch detection electrode E2, a current $I_0$ flows as illustrated in FIG. 3 depending on the charge and discharge of the capacitance of the capacitive element C1. The voltage detector DET illustrated in FIG. 3 converts a variation in the current $I_0$ depending on the AC rectangular wave Sg into a variation in voltage (a waveform $V_0$ denoted by solid lines in FIG. 6).

On the other hand, as illustrated in FIG. 4, with a finger in contact with or in close proximity to the touch detection electrode E2, a fringe capacitance resulting from an electric field established off from an end of the drive electrode E1 and the touch detection electrode E2 is absorbed as the capacitive element C2 of the finger. As a result, due to the influence by the capacitive element C2, the capacitive element C1 operates as a capacitive element C1a which has a capacitance value less than that of the capacitive element C1. Further, as the capacitive element C1a is charged or discharged, a current $I_1$ flows depending on the capacitance value of the capacitive element C1a as illustrated in FIG. 5. The voltage detector DET illustrated in FIG. 5 converts a variation in the current $I_1$ depending on the AC rectangular wave Sg into a variation in voltage (a waveform $V_1$ denoted by dotted lines in FIG. 6).

As illustrated in FIG. 6, the waveform $V_1$ has a reduced amplitude when compared with the waveform $V_0$ mentioned above. Therefore, the absolute value $|\Delta V|$ of a voltage difference $\Delta V$ between the waveform $V_0$ and the waveform $V_1$ is to be varied depending on the influence caused by an externally approaching pointer (such as a finger or stylus). It should be noted that to detect the absolute value $|\Delta V|$ of the voltage difference $\Delta V$ with high accuracy, the voltage detector DET is configured more preferably to operate in a manner such that a switching element provides a period Reset in which charges stored in the capacitor are discharged at the frequency of the AC rectangular wave Sg.

Then, with appropriate timing, the A/D converter 43 samples an analog signal, which has an absolute value |ΔV| and is outputted from the signal amplifier 42, and converts the resulting signal into a digital signal. The signal processing unit 44 performs an operation to average the data of the absolute values |ΔV| (digital signals) outputted from the A/D converter 43 so as to calculate, for example, the average value of the absolute values |ΔV|. This allows the signal processing unit 44 to reduce the influence caused by noise on the absolute value |ΔV|. Further, the signal processing unit 44 compares the resulting average value of the absolute values |ΔV| with a predetermined threshold voltage Vth. If the average value is equal to or greater than the threshold voltage Vth, the pointer is determined to be in contact with or in close proximity to the electrode, whereas if the average value is less than the threshold voltage Vth, the pointer is determined to be neither in contact with nor in close proximity to the electrode. In this manner, a touch detection operation is achieved.

Configuration Example of the Display Unit with a Touch Detection Function 10

Figure 7:
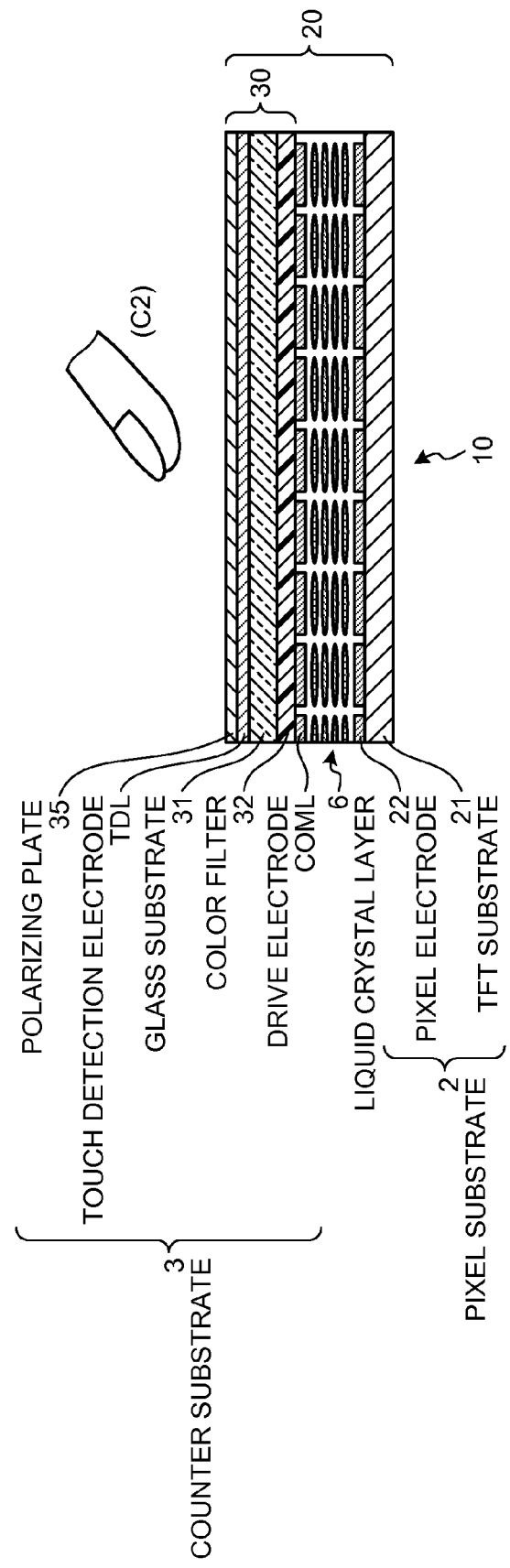
FIG. 7 is a schematic cross-sectional view illustrating a display unit with a touch detection function according to the first embodiment of the present disclosure.
Figure 8:
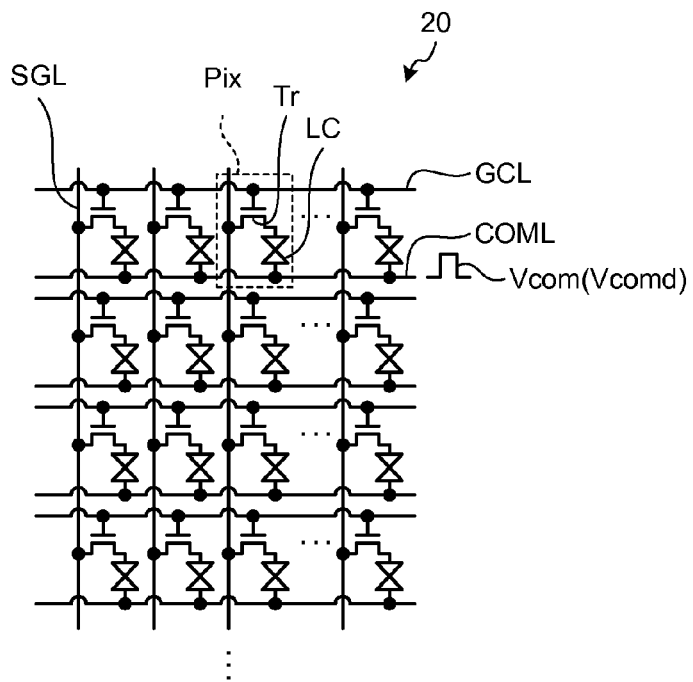
FIG. 8 is a circuit diagram illustrating a pixel array of a liquid crystal display unit in the display unit with a touch detection function according to the first embodiment of the present disclosure.
Figure 9:
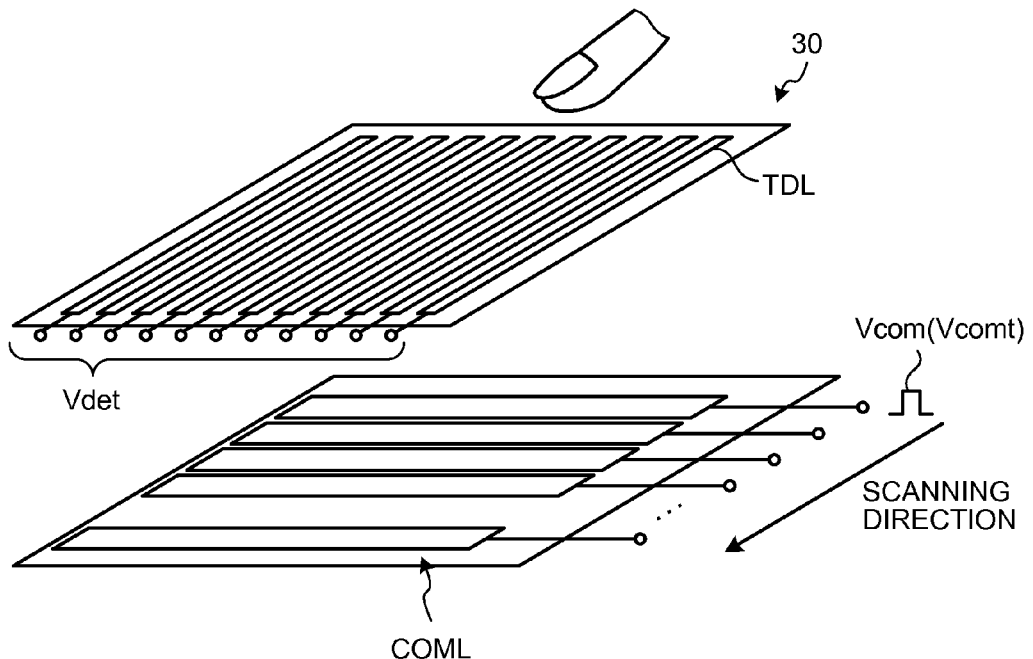
FIG. 9 is a perspective view illustrating a configuration example of drive electrodes and touch detection electrodes of the display unit with a touch detection function according to the first embodiment of the present disclosure.

FIG. 7 is a schematic cross-sectional view illustrating the display unit with a touch detection function of the present embodiment. FIG. 8 is a circuit diagram illustrating a pixel array in the liquid crystal display unit of the display unit with a touch detection function of the present embodiment. Further, FIG. 9 is a perspective view illustrating a configuration example of the drive electrode and the touch detection electrode of the display unit with a touch detection function of the present embodiment. With reference to FIGS. 7 to 9, a description will be made to a configuration example of the display unit with a touch detection function 10.

As illustrated in FIG. 7, the display unit with a touch detection function 10 includes a pixel substrate 2, a counter substrate 3 opposed to the pixel substrate 2, and a liquid crystal layer 6 interposed between the pixel substrate 2 and the counter substrate 3.

The pixel substrate 2 has a TFT substrate 21 serving as a circuit board, and a plurality of transparent pixel electrodes 22 which are provided on the TFT substrate 21 in a matrix and formed of an indium tin oxide (ITO). On the TFT substrate 21 are formed the thin film transistor (TFT) elements Tr of the respective pixels Pix illustrated in FIG. 8, and wiring such as the pixel signal lines SGL for supplying the pixel signal Vpix to each of the pixel electrodes 22 and the scanning signal lines GCL for driving each of the TFT elements Tr. The liquid crystal display unit 20 illustrated in FIG. 8 has a plurality of pixels Pix arranged in a matrix. As will be described later, the liquid crystal display unit 20 performs the display operation by sequentially scanning horizontal lines one by one according to the scanning signal Scan outputted from the gate driver 12.

The pixel Pix includes the TFT element Tr and a liquid crystal element LC. The TFT element Tr has the source coupled to the pixel signal line SGL, the gate coupled to the scanning signal line GCL, and the drain coupled to the pixel electrode 22. When a liquid crystal display unit that actuates the liquid crystal molecules of the liquid crystal element LC by a vertical electric field is employed as the liquid crystal display unit, the drive electrodes COML are opposed to the pixel electrodes 22, while the liquid crystal element LC is interposed between the pixel electrodes 22 and the drive electrodes COML. A liquid crystal display unit which actuates the liquid crystal molecules by a horizontal electric field will be described with reference to a modification.

As illustrated in FIG. 8, via the scanning signal line GCL, the TFT element Tr of a pixel Pix is coupled to the TFT elements Tr of the other pixels Pix that belong to the same row of the liquid crystal display unit 20, and the gate driver 12 supplies the scanning signal Scan to the scanning signal line GCL. Via the pixel signal line SGL, the TFT element Tr of a pixel Pix is coupled to the TFT element Tr of the other pixels Pix that belong to the same column of the liquid crystal display unit 20, and the source driver 13 supplies the pixel signal Vpix to the pixel signal line SGL. Furthermore, via the drive electrode COML, the pixel Pix is coupled to the other pixels Pix that belong to the same row of the liquid crystal display unit 20, and the drive electrode driver 14 supplies the drive signal Vcom to the drive electrode COML. The drive electrode COML is supplied with an AC rectangular wave drive signal Vcom (a display drive signal Vcomd, to be described later, and the touch detection drive signal Vcomt) from the drive electrode driver 14.

When the display operation is executed with the liquid crystal display unit 20 configured as described above, the gate driver 12 allows the scanning signal Scan to sequentially scan the scanning signal lines GCL in a time-divisional manner, thereby sequentially selecting the horizontal lines one by one. In the liquid crystal display unit 20, the source driver 13 supplies the pixel signal Vpix to the pixels Pix that belong to one horizontal line, thereby allowing the display operation to be executed on the horizontal lines one by one. When this display operation is executed, the drive electrode driver 14 applies the display drive signal Vcomd to a block that includes the drive electrode COML corresponding to one horizontal line.

The counter substrate 3 includes a glass substrate 31, a color filter 32 provided on a surface of the liquid crystal layer 6 side of the glass substrate 31 and a plurality of drive electrodes COML provided on a surface of the liquid crystal layer 6 side of the color filter 32. Furthermore, the counter substrate 3 includes a plurality of touch detection electrodes TDL provided on a surface opposite side to the liquid crystal layer 6 of the glass substrate 31 e, and a polarizing plate 35 provided on the surface opposite side to the liquid crystal layer 6 of the touch detection electrodes TDL. The touch detection device 30 illustrated in FIG. 9 includes a plurality of drive electrodes COML which are provided side by side in a stripe shape and a plurality of touch detection electrodes TDL which are provided side by side in a stripe shape so as to be opposed to the drive electrodes COML in such a direction as to intersect the drive electrodes COML, the electrodes COML and TDL being provided on the counter substrate 3. As will be described later, the touch detection device 30 performs a touch detection operation by sequentially scanning blocks one by one according to the touch detection drive signal Vcomt outputted from the drive electrode driver 14.

The color filter 32 has a color filter layer of three colors, for example, red (R), green (G), and blue (B) which are regularly arranged with the three colors, R, G, and B associated one by one with the aforementioned pixels Pix illustrated in FIG. 8.

The drive electrode COML serves as the common drive electrode of the liquid crystal display unit 20 as well as the drive electrode of the touch detection device 30. Use of such an arrangement can reduce the thickness of the display unit with a touch detection function 10 and facilitate synchronization between the liquid crystal display unit 20 and the touch detection device 30. One drive electrode COML is opposed to the plurality of pixel electrodes 22 that constitute one row.

The touch detection electrodes TDL are each coupled to the signal amplifier 42 of the touch detection unit 40 and form a capacitance at each intersection with the drive electrodes COML.

When a touch detection operation is executed with the touch detection device 30 configured as described above, the drive electrode driver 14 allows the touch detection drive signal Vcomt to sequentially scan and drive blocks A1 to An, to be described later, in a time-divisional manner, thereby sequentially selecting a block on which a touch detection operation is performed. Then, the touch detection unit 40 receives the touch detection signal Vdet from the touch detection electrodes TDL and determines whether a touch is detected on the selected block. That is, the touch detection device 30 and the touch detection unit 40 execute a touch detection operation by following the aforementioned basic principle of the touch detection operation.

The liquid crystal layer 6 includes the liquid crystal element LC and allows light passing therethrough to be subjected to optical rotation or birefringence depending on the state of an electric field. For example, the liquid crystal layer 6 may employ a vertical electric field mode as a drive system for the liquid crystal, more specifically, such as the twisted nematic (TN) mode, the vertical alignment (VA) mode, or the optically compensated bend (OCB) mode.

It should be noted that an alignment film (not illustrated) is provided between the liquid crystal layer 6 and the pixel substrate 2 and between the liquid crystal layer 6 and the counter substrate 3. There is also provided an incidence-side polarizing plate (not illustrated) on the surface opposite to the surface of the pixel substrate 2 on which the plurality of pixel electrodes 22 are provided.

Outline of Entire Operation

Figure 10A:
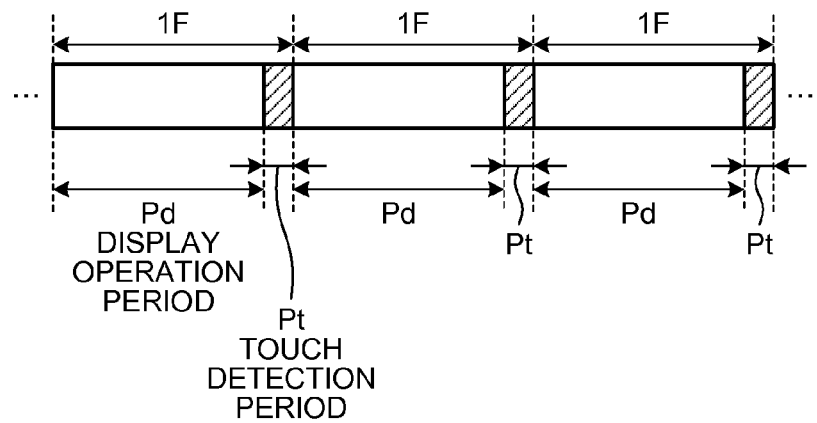
FIG. 10A is a view illustrating the relationship between a display operation period and a touch detection period in the display unit with a touch detection function according to the first embodiment of the present disclosure.

FIG. 10A is a view illustrating the relationship between the display operation period and the touch detection period of the display device with a touch detection function according to the first embodiment of the present disclosure. With reference to FIG. 10A, a description will be made to the outline of the entire operation of the display device with a touch detection function 1 according to the present embodiment.

Figure 10B:
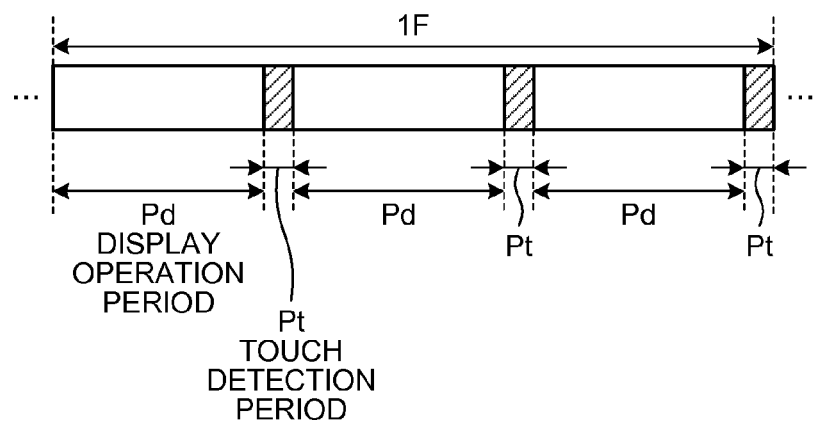
FIG. 10B is a view illustrating another relationship between a display operation period and a touch detection period in the display unit with a touch detection function according to the first embodiment of the present disclosure.

As illustrated in FIG. 10A one frame period (1F) is made up of a display operation period Pd and a touch detection period Pt. That is, each touch detection period Pt is set as a period in a vertical blanking period of the display operation. The display device with a touch detection function 1 executes a display operation on a screen GS (refer to FIGS. 11 to 13 to be described later) of the display unit with a touch detection function 10 during the display operation period Pd, while executing a touch detection operation on the screen GS during the touch detection period Pt. That is, the display device with a touch detection function 1 executes the display operation during the display operation period Pd and the touch detection operation during the touch detection period Pt in a time-divisional manner repeatedly and alternately. The display device with a touch detection function 1 executes one screenful of display operations on the screen GS during each display operation period Pd, while executing one screenful of touch detection operations on the screen GS during each touch detection period Pt. It should be noted that as illustrated in FIG. 10A, the display operation period Pd and the touch detection period Pt may each be allowed once in each one frame period, or alternatively, as illustrated in FIG. 10B, the display operation period Pd and the touch detection period Pt may also be repeated multiple times in each one frame period.

First, based on the video signal Vdisp supplied from outside, the control unit 11 outputs the control signal to each of the gate driver 12, the source driver 13, the drive electrode driver 14, and the touch detection unit 40 so as to control thereto so that these components operate in synchronization with each other. The control unit 11 controls to execute the display operation during the display operation period Pd and the touch detection operation during the touch detection period Pt, in a time-divisional manner.

During the display operation period Pd, the gate driver 12 outputs the scanning signal Scan to a predetermined number of scanning signal lines GCL of the liquid crystal display unit 20 so as to sequentially select one horizontal line of pixels Pix to be displayed that are provided on the liquid crystal display unit 20 in a matrix. During the display operation period Pd, the source driver 13 outputs the pixel signal Vpix through the pixel signal lines SGL to each of the pixels Pix which constitute one horizontal line selected by the gate driver 12. In these pixels Pix, the display operation of one horizontal line is executed according to the pixel signal Vpix being supplied. Then, during the display operation period Pd, the drive electrode driver 14 applies the display drive signal Vcomd sequentially to the blocks A1 to An (see FIGS. 11 to 13 to be described later) that are made up of a predetermined number of drive electrodes COML corresponding to one horizontal line selected by the gate driver 12. As described above, during the display operation period Pd, the display unit with a touch detection function 10 executes the display operation in accordance with each signal outputted by the gate driver 12, the source driver 13, and the drive electrode driver 14.

During the touch detection period Pt, the drive electrode driver 14 applies the touch detection drive signal Vcomt sequentially to the blocks A1 to An that are made up of a predetermined number of drive electrodes COML, thereby sequentially selecting those blocks on which a touch detection is performed. The touch detection electrodes TDL of the touch detection device 30 outputs the touch detection signal Vdet that is generated by the touch detection drive signal Vcomt applied to the drive electrodes COML. During the touch detection period Pt, the signal amplifier 42 detects and amplifies the touch detection signal Vdet outputted from the touch detection electrodes TDL and removes a high frequency component (noise component) included in the touch detection signal Vdet. During the touch detection period Pt, the A/D converter 43 samples an analog signal outputted from the signal amplifier 42 to convert into a digital signal. More specifically, the A/D converter 43 samples an analog signal outputted from the signal amplifier 42 with timing in synchronization with the touch detection drive signal Vcomt or at a sampling frequency higher than the frequency of the timing and converts the resulting analog signal into a digital signal. During the touch detection period Pt, the signal processing unit 44 determines whether a touch is detected on the touch detection device 30 based on a digital signal outputted from the A/D converter 43. When a touch is detected by the signal processing unit 44 during the touch detection period Pt, the coordinate extracting unit 45 derives a signal value (to be described later) in a region where a touch is detected based on a digital signal supplied from the signal processing unit 44. Next, based on a three-dimensional waveform formed by the signal value, the coordinate extracting unit 45 derives the coordinates (target point) that are considered to be a contact point or proximity point intended by a user on the screen GS, and the axial direction of the pointer. Then, the coordinate extracting unit 45 outputs the coordinate data of the derived target point and the axial data of the pointer as the output signal Out. The detection timing control unit 47 controls so that the signal amplifier 42, the A/D converter 43, the signal processing unit 44, the coordinate extracting unit 45, and the noise detection unit 46 operate in synchronization with each other. As described above, during the touch detection period Pt, the display unit with a touch detection function 10 and the touch detection unit 40 execute the touch detection operation based on the touch detection signal Vdet outputted from the touch detection electrodes TDL.

It should be noted that the display device with a touch detection function 1 has been described to execute one screenful of operations on the screen GS during each period; however, present embodiment is not limited thereto. For example, the display device with a touch detection function 1 may also be configured to execute one or more screenful of operations or one or less screenful of operations on the screen GS.

During the touch detection period Pt in which the touch detection operation is executed, various types of signals (the scanning signal Scan and the pixel signal Vpix) for executing the display operation are not outputted to the liquid crystal display unit 20. Thus, during the touch detection period Pt, the scanning signal lines GCL and the pixel signal lines SGL (not illustrated) provided on the pixel substrate 2 are in a floating state or held at a DC potential. This makes it possible to reduce the possibility that noise is transmitted through a parasitic capacitance from the scanning signal lines GCL and the pixel signal lines SGL to the touch detection electrodes TDL. That is, the display device with a touch detection function 1 according to the present embodiment can reduce the influence that internal noise has on the touch detection operation.

Display Operation During the Display Operation Period Pd

Figure 11:
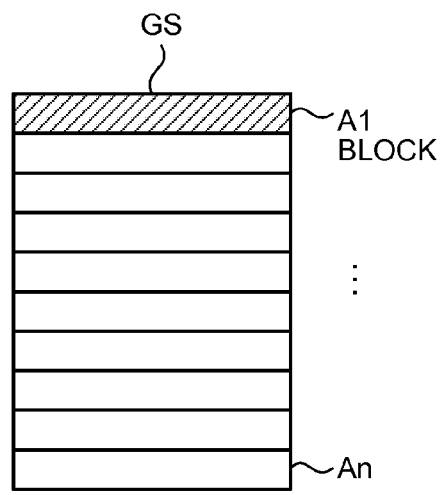
FIG. 11 is a view illustrating an operation example of a drive electrode driver according to the first embodiment of the present disclosure.
Figure 12:
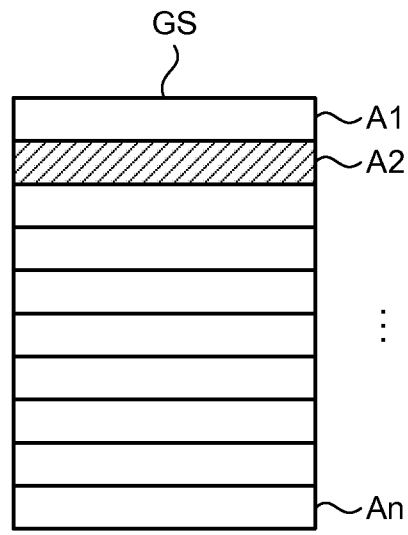
FIG. 12 is a view illustrating an operation example of the drive electrode driver according to the first embodiment of the present disclosure.
Figure 13:
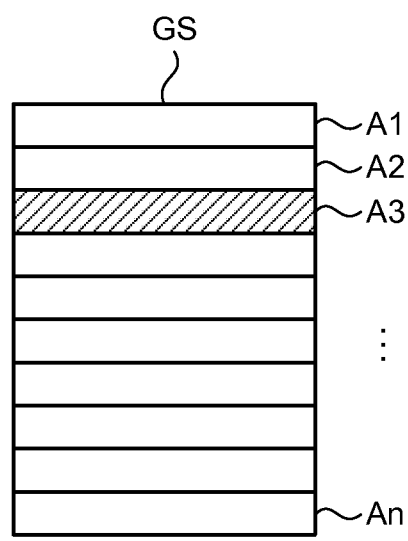
FIG. 13 is a view illustrating an operation example of the drive electrode driver according to the first embodiment of the present disclosure.
Figure 14:
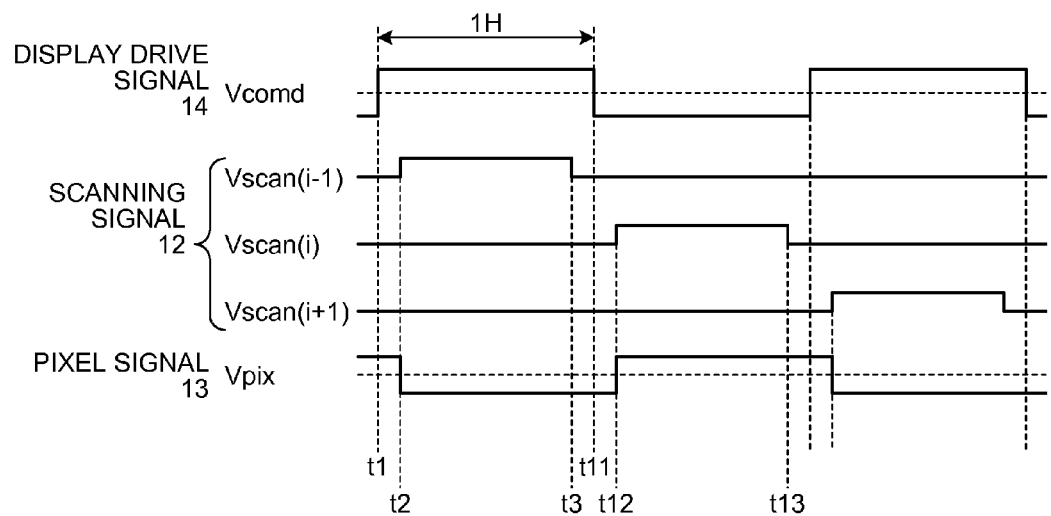
FIG. 14 is a view illustrating an example of the timing of each signal in a display operation period of the display device with a touch detection function according to the first embodiment of the present disclosure.

FIGS. 11 to 13 each are a view illustrating an operation example of the drive electrode driver according to the first embodiment of the present disclosure. FIG. 14 is a view illustrating an example of timing of each signal during the display operation period of the display device with a touch detection function according to the first embodiment of the present disclosure. With reference to FIGS. 11 to 14, a description will be made to the display operation during the display operation period Pd of the display device with a touch detection function 1 according to of the present embodiment.

FIG. 14 illustrates the waveform of the display drive signal Vcomd, the waveform of the scanning signal Scan, and the waveform of the pixel signal Vpix. Further, FIG. 14 illustrates an example of the case where the display operation during the display operation period Pd is achieved by line inversion drive. Now, a description will be made to the case where a particular block A1 among the blocks A1 to An on the screen GS is to be driven. As illustrated in FIG. 14, "i" indicates one horizontal line of the pixels Pix in a particular row (the i-th row), the pixels Pix being formed in a matrix.

At timing t1, the drive electrode driver 14 applies the display drive signal Vcomd to the drive electrodes COML that belong to the block A1 so as to change the voltage level thereof from a low level to a high level. From the point at which the voltage level of the display drive signal Vcomd has been changed, one horizontal period (1H) is started.

Next, at timing t2, the gate driver 12 applies the scanning signal Scan to the scanning signal lines GCL corresponding to a plurality of pixels Pix in one horizontal line on the (i−1)th row included in the block A1 and changes the voltage level from a low level to a high level. At the same timing t2, the source driver 13 applies the pixel signal Vpix to the pixel signal lines SGL so as to change the voltage level from a high level to a low level, whereby the display operation of one horizontal line of the plurality of pixels Pix in the (i−1)th row is started.

Next, at timing t3, the gate driver 12 changes, from a high level to a low level, the voltage level of the scanning signal Scan applied to the scanning signal lines GCL corresponding to one horizontal line of the plurality of pixels Pix in the (i−1)th row. In this manner, the display operation of one horizontal line of the plurality of pixels Pix in the (i−1)th row is ended.

Now, at timing t11, the drive electrode driver 14 applies the display drive signal Vcomd to the drive electrodes COML that belong to the block A1, thereby changing the voltage level from a high level to a low level. This causes one horizontal period (1H) to be ended and the next one horizontal period (1H) to be started.

Now, at timing t12, the gate driver 12 applies the scanning signal Scan to the scanning signal lines GCL corresponding to one horizontal line of the plurality of pixels Pix in the i-th row included in the block A1, thereby changing the voltage level from a low level to a high level. At the same timing t12, the source driver 13 applies the pixel signal Vpix to the pixel signal lines SGL so as to change the voltage level from a low level to a high level, thereby starting the display operation of one horizontal line of the plurality of pixels Pix in the i-th row. It should be noted that since in the present embodiment, the display device with a touch detection function 1 executes the display operation by line inversion drive, the pixel signal Vpix applied by the source driver 13 has an inverted polarity with respect to the one in the immediately preceding one horizontal period (1H).

Now, at timing t13, the gate driver 12 changes, from a high level to a low level, the voltage level of the scanning signal Scan applied to the scanning signal lines GCL corresponding to one horizontal line of the plurality of pixels Pix in the ith row. This causes the display operation of one horizontal line of the plurality of pixels Pix in the ith row to be ended.

The display device with a touch detection function 1 according to the present embodiment repeats the operations mentioned above, thereby executing the display operation of the block A1 on the screen GS. Then, as described above, while sequentially shifting the blocks, to which the display drive signal Vcomd is applied, downwardly from the block A1, the display device with a touch detection function 1 executes the aforementioned display operation on each of the blocks A1 to An, thereby executing the display operation on the entire surface of the screen GS.

Touch Detection Operation During the Touch Detection Period Pt

Figure 15:
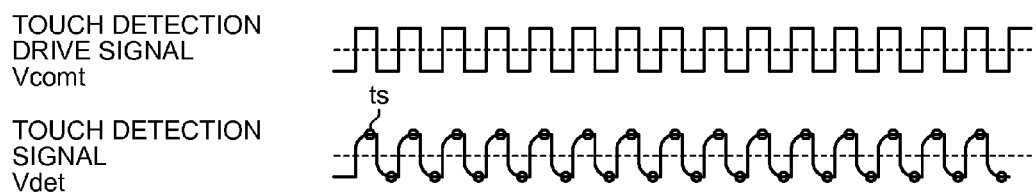
FIG. 15 is a view illustrating an example of the timing of each signal in a touch detection period of the display device with a touch detection function according to the first embodiment of the present disclosure.

FIG. 15 is a view illustrating an example of timing of each signal during the touch detection period of the display device with a touch detection function according to the first embodiment of the present disclosure. With reference to FIGS. 1 and 15, a description will be made to the touch detection operation during the touch detection period Pt of the display device with a touch detection function 1 according to the present embodiment.

FIG. 15 illustrates the waveform of the touch detection drive signal Vcomt and the waveform of the touch detection signal Vdet. Now, a description will be made to the case where a particular block A1 among the blocks A1 to An on the screen GS is to be driven.

The drive electrode driver 14 applies the touch detection drive signal Vcomt to the drive electrodes COML that belong to the block A1. The frequency of the touch detection drive signal Vcomt is desirably higher than the frequency of the display drive signal Vcomd during the display operation period Pd.

The touch detection drive signal Vcomt applied to the drive electrodes COML that belong to the block A1 is transmitted to the touch detection electrodes TDL through a capacitance, thereby causing the touch detection signal Vdet to be changed.

Next, the A/D converter 43 performs A/D conversion on the touch detection signal Vdet, which is amplified by the signal amplifier 42 and is an analog signal, with a sampling timing ts in synchronization with the touch detection drive signal Vcomt (or at a sampling frequency higher than the frequency of the sampling timing ts).

As described above, the frequency of the touch detection drive signal Vcomt during the touch detection period Pt is made higher than the frequency of the display drive signal Vcomd during the display operation period Pd, and the A/D converter 43 samples the touch detection signal Vdet with the sampling timing ts in synchronization with the touch detection drive signal Vcomt (or at a sampling frequency higher than the frequency of the sampling timing ts). This allows sampling at higher frequencies and thereby enables an increased number of times of sampling and reduction of noise components when compared with the case where the display drive signal Vcomd is applied to the block A1 to sample the touch detection signal Vdet with the timing in synchronization with the display drive signal Vcomd. Thus, for example, even when an external noise is transmitted to the touch detection device 30, it is possible to reduce a noise component that may appear at the output of the A/D converter 43 caused by the external noise. That is, the display device with a touch detection function 1 can reduce the influence that the external noise exerts on the touch detection operation.

Next, the signal processing unit 44 determines whether a touch is detected on the touch detection device 30 based on a digital signal converted from analog to digital by the A/D converter 43 and outputted therefrom. It is determined whether a touch is detected, for example, based on a threshold value as described above in relation to FIG. 6.

It should be noted that the same number of blocks A1 to An to be divided on the screen GS may not need to be used both during the display operation period Pd and during the touch detection period Pt.

Figure 16:
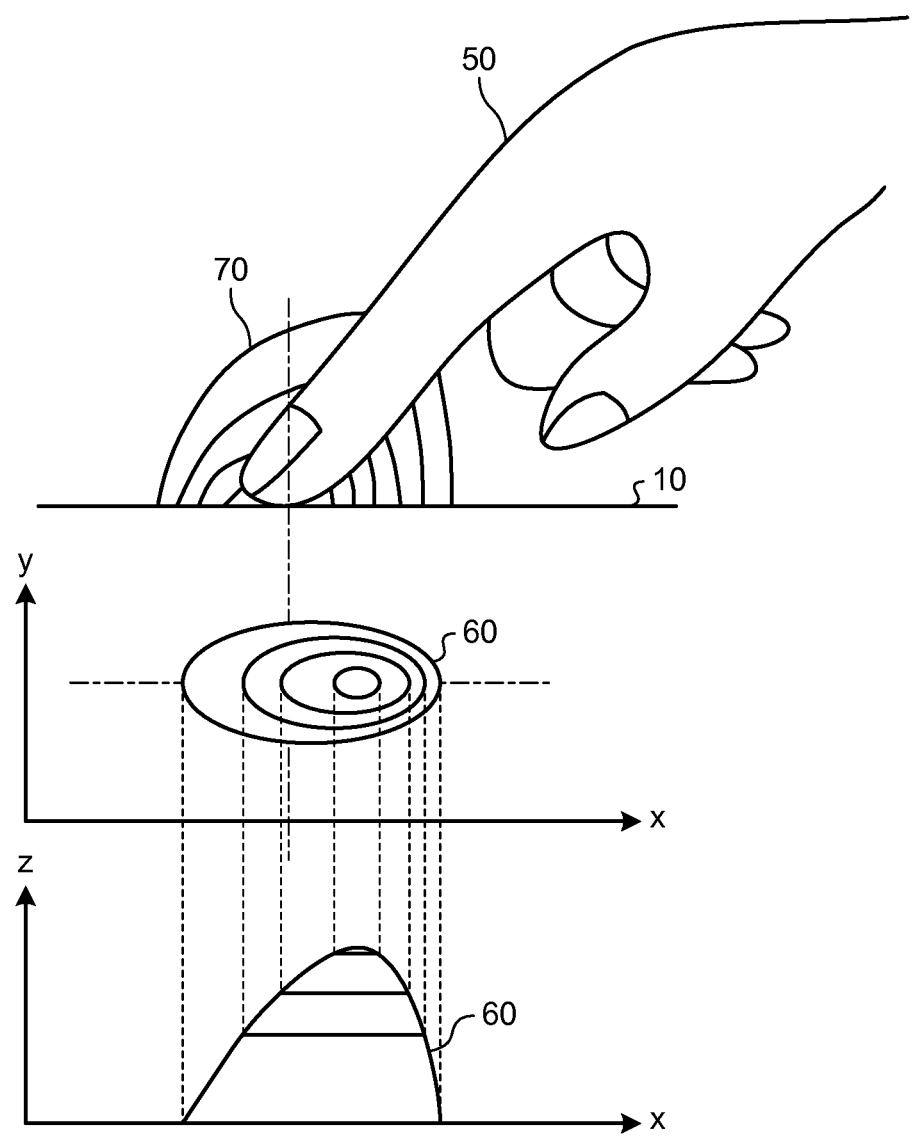
FIG. 16 is a view illustrating an example of a three-dimensional waveform formed by a signal that is detected when a finger is in contact with or in close proximity to the display unit with a touch detection function according to the first embodiment of the present disclosure.
Figure 17:
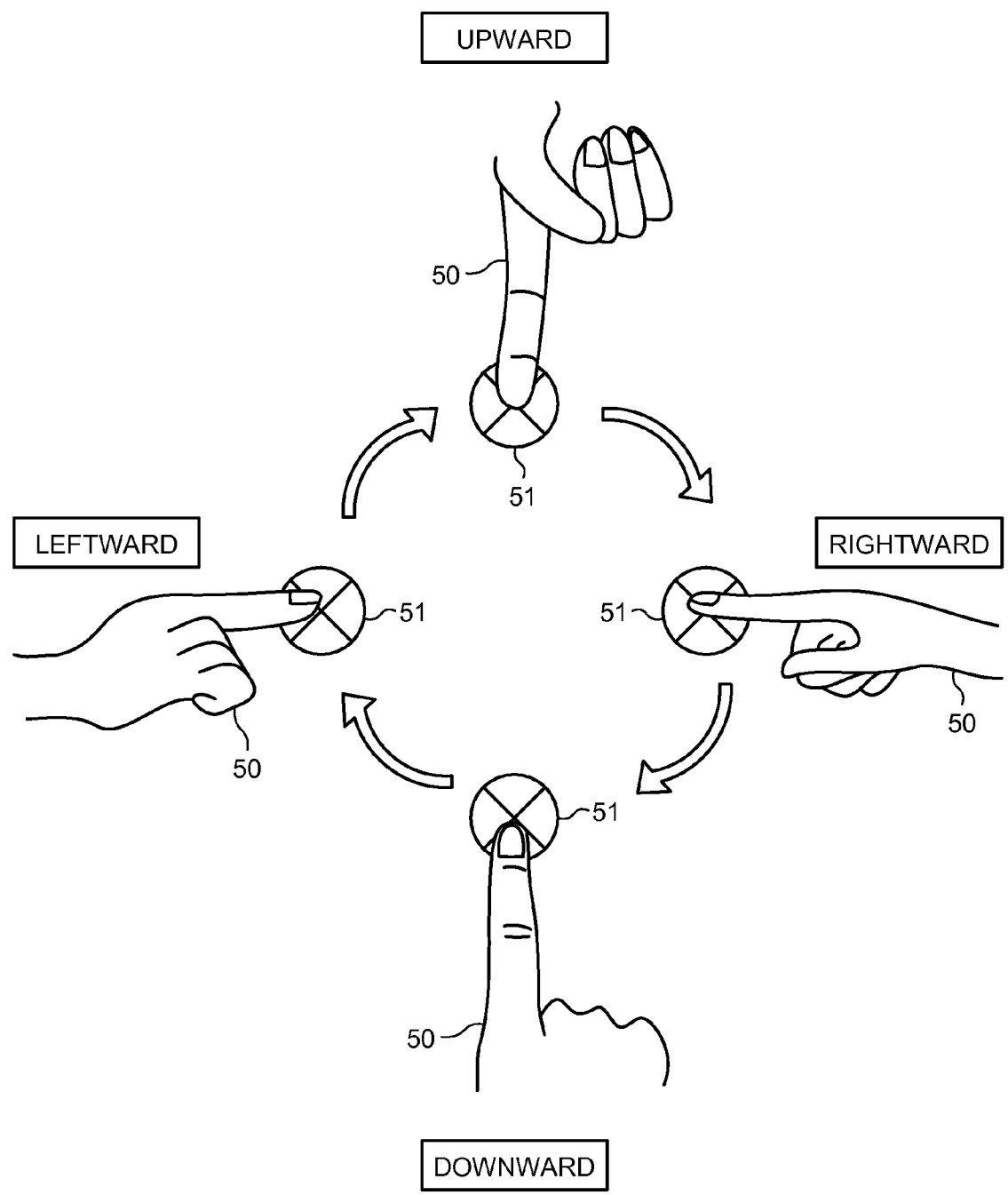
FIG. 17 is a view illustrating the axial direction of a finger being rotated at a touch point on the display unit with a touch detection function according to the first embodiment of the present disclosure.
Figure 18:
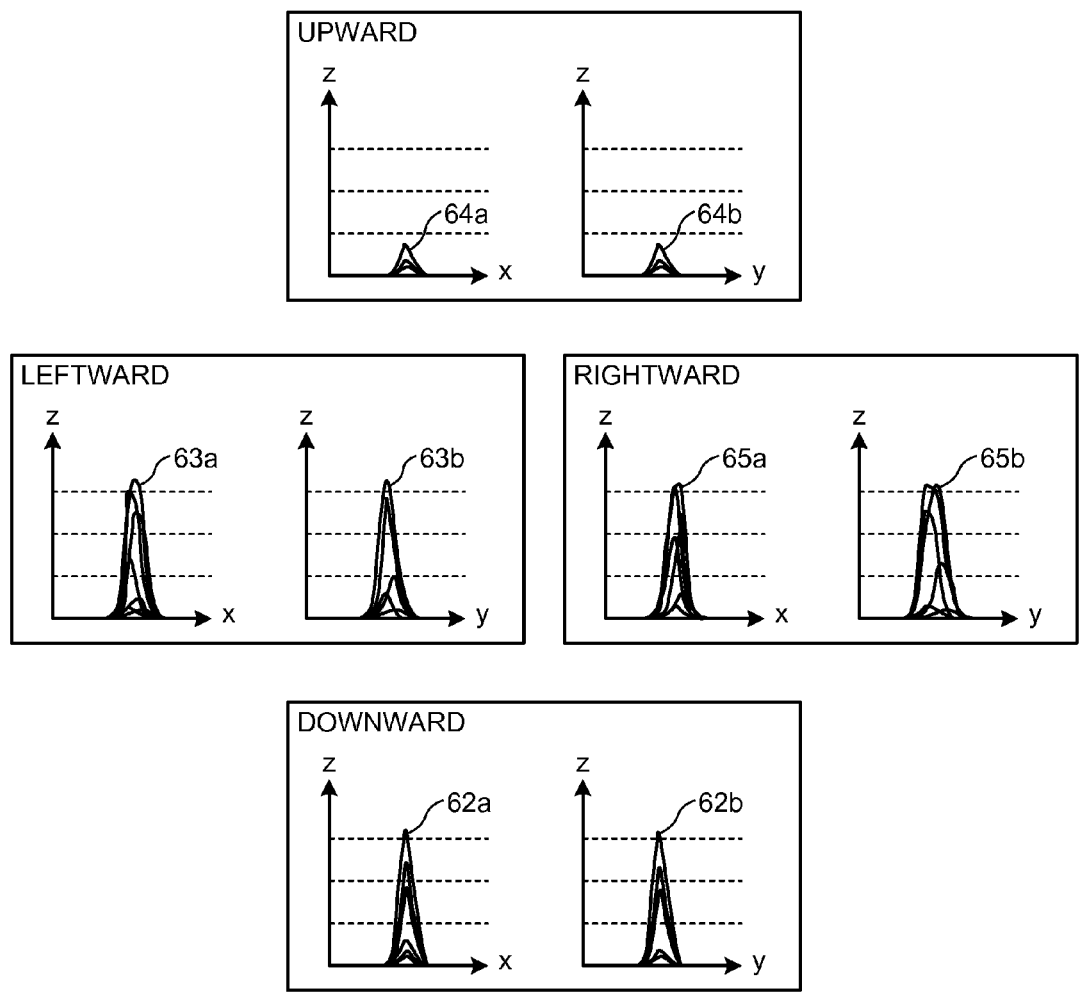
FIG. 18 is a view illustrating three-dimensional waveform examples detected when the axial direction of a finger is varied to a downward, leftward, upward, and rightward position at a touch point on the display unit with a touch detection function according to the first embodiment of the present disclosure.

Operation for Deriving the Target Point and the Pointer Direction During the Touch Detection Period Pt FIG. 16 is a view illustrating an example of a three-dimensional waveform which is formed by a signal detected when a finger is in contact with or in close proximity to the display unit with a touch detection function according to the first embodiment of the present disclosure. FIG. 17 is a view illustrating the axial direction of a finger being rotated at a touch point on the display unit with a touch detection function according to the first embodiment of the present disclosure. Further, FIG. 18 is a view illustrating three-dimensional waveform examples detected when the axial direction of a finger is varied to a downward, leftward, upward, and rightward position at a touch point on the display unit with a touch detection function according to the first embodiment of the present disclosure.

There exists a capacitance (equivalent to the static capacitance of the capacitive element C1 illustrated in FIG. 2) between the drive electrode COML illustrated in FIG. 9 described above (equivalent to the drive electrode E1 illustrated in FIG. 2) and the touch detection electrode TDL (the touch detection electrode E2 illustrated in FIG. 2) illustrated in FIG. 9 described above. When the drive electrode driver 14 applies the touch detection drive signal Vcomt to the drive electrodes COML, this causes the potential of the touch detection signal Vdet to appear on the touch detection electrodes TDL. This causes an electric field to be established between the drive electrodes COML and the touch detection electrodes TDL. The electric field is represented by the electric lines of force that are directed from the drive electrodes COML to the touch detection electrodes TDL. It should be noted that the orientation of the electric lines of force will be inverted when the polarity of the touch detection drive signal Vcomt applied to the drive electrodes COML is inverted.

As illustrated in FIG. 16, when a finger 50 is in contact with or in close proximity to the surface of the display unit with a touch detection function 10, electric lines of force 70 that are some of the electric lines of force between the drive electrodes COML and the touch detection electrodes TDL are absorbed by the finger 50. As a result, the magnitude of electric field between the drive electrodes COML and the touch detection electrodes TDL is reduced, that is, the absolute value of the potential of the touch detection signal Vdet detected on the touch detection electrodes TDL is decreased (corresponding to the waveform $V_1$ of FIG. 6). As described above in relation to FIGS. 4 and 5, this phenomenon corresponds to the phenomenon which is described below. The fringe capacitance between the drive electrodes COML and the touch detection electrodes TDL, which are opposed to each other, is absorbed by the finger 50 that serves as the capacitive element C2. As a result, the capacitive element C1 that is formed by the drive electrodes COML and the touch detection electrodes TDL being opposed to each other is affected by the finger 50 serving as the capacitive element C2 and operates as the capacitive element C1$a$ that has a capacitance value smaller than the capacitance value of the capacitive element C1. Further, the current $I_f$ flowing depending on the capacitance value of the capacitive element C1$a$ will result in the absolute value of the detected potential of the touch detection signal Vdet being decreased.

The "signal value" is defined as the difference between the potential of the touch detection signal Vdet detected when the finger 50 is neither in contact with nor in close proximity to the display unit with a touch detection function 10 (the waveform $V_0$ of FIG. 6) and the potential of the touch detection signal Vdet detected when the finger 50 is in contact with or in close proximity to the display unit with a touch detection function 10 (the waveform $V_1$ of FIG. 6). The difference between the potential of the waveform $V_0$ and the potential of the waveform $V_1$ may be the difference between the average values of rectangular potential rises in a predetermined period among the rectangular waves of the touch detection signal Vdet illustrated in FIG. 6 or FIG. 15, so that the difference between these values may also be defined as the "signal value." More specifically, during the touch detection period Pt, the touch detection signal Vdet that is an analog signal is converted from analog to digital by the A/D converter 43, so that the coordinate extracting unit 45 derives the signal value based on the resulting digital signal.

Then, the coordinate extracting unit 45 derives the signal value at each coordinates of a region where a touch is detected as a result of the finger 50 being in contact with or in close proximity to the display unit with a touch detection function 10, and derives a three-dimensional waveform 60 that is formed by the signal values as illustrated in FIG. 16. For the sake of convenience, the "x-axis" of FIG. 16 represents positions in the extending direction of the drive electrodes COML illustrated in FIG. 9; the "y-axis" represents positions in a direction orthogonal to the x-axis or positions in the extending direction of the touch detection electrodes TDL illustrated in FIG. 9; and the "z-axis" represents the magnitude of the signal value. FIG. 17 illustrates the finger 50 in contact with or in close proximity to a touch point 51 on the surface of the display unit with a touch detection function 10, the finger 50 being rotated about the touch point 51 so that when viewed from the front side of the sheet of FIG. 17, the base of the finger 50 in the axial direction of the finger 50 is oriented in the downward, leftward, upward, and rightward directions. Further, FIG. 18 is a view, with the finger 50 oriented in each of the aforementioned axial directions, illustrating waveform diagrams provided when three-dimensional waveforms of signal values derived by the coordinate extracting unit 45 are viewed along the x-axis and the y-axis. More specifically, a three-dimensional waveform 62a is available when viewed along the y-axis with the base of the finger 50 being oriented downward, and a three-dimensional waveform 62b is available with the base of the finger 50 being oriented downward when viewed along the x-axis. A three-dimensional waveform 63a is available with the base of the finger 50 being oriented leftward when viewed along the y-axis, and a three-dimensional waveform 63b is available with the base of the finger 50 being oriented leftward when viewed along the x-axis. A three-dimensional waveform 64a is available with the base of the finger 50 being oriented upward when viewed along the y-axis, and a three-dimensional waveform 64b is available with the base of the finger 50 being oriented upward when viewed along the x-axis. Further, a three-dimensional waveform 65a is available with the base of the finger 50 being oriented rightward when viewed along the y-axis, and a three-dimensional waveform 65b is available with the base of the finger 50 being oriented rightward when viewed along the x-axis.

The base of the finger 50 being oriented upward corresponding to the three-dimensional waveform 64a and the three-dimensional waveform 64b of the three-dimensional waveforms illustrated in FIG. 18 is oriented in a manner such that the axial direction of the finger 50 is oriented nearly along the perpendicular direction when compared with the other orientations of the base of the finger 50. As described above, with the axial direction of the finger 50 being oriented nearly along the perpendicular direction, the base of the finger 50 is located farther from the surface of the display unit with a touch detection function 10 when compared with the finger 50 oriented in the other directions. This causes a decrease in the amount of the electric lines of force to be absorbed by the finger 50 between the drive electrodes COML and the touch detection electrodes TDL, thereby also causing a decrease in the signal value. Thus, as illustrated in FIG. 18, the three-dimensional waveform 64a (64b) formed by the signal value has a magnitude along the z-axis that is smaller than that of the other three-dimensional waveforms.

Figure 20:
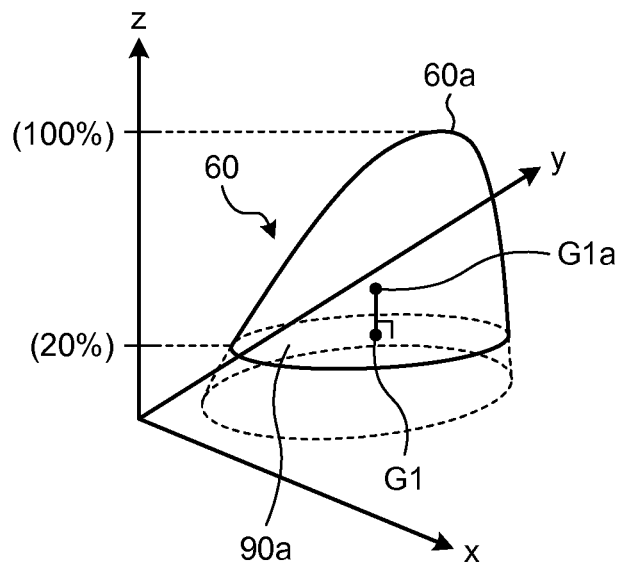
FIG. 20 is an explanatory view illustrating a volume barycenter of a three-dimensional waveform portion that is equal to or greater than a first threshold value.
Figure 21:
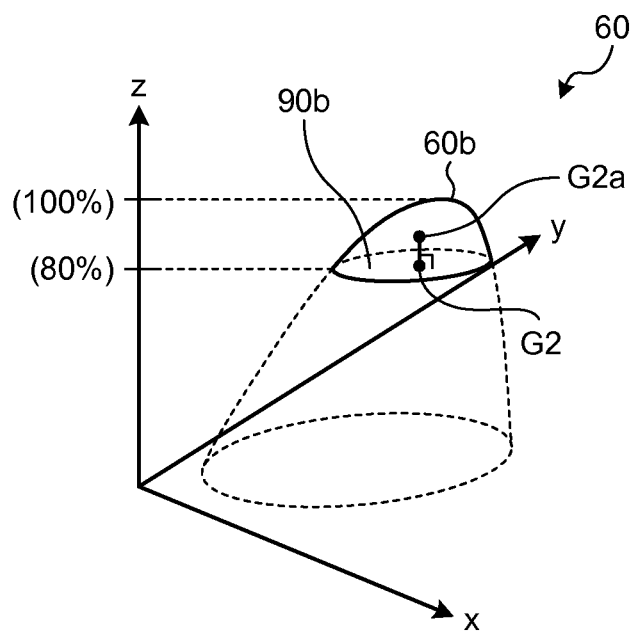
FIG. 21 is an explanatory view illustrating a volume barycenter of a three-dimensional waveform portion that is equal to or greater than a second threshold value.
Figure 22:
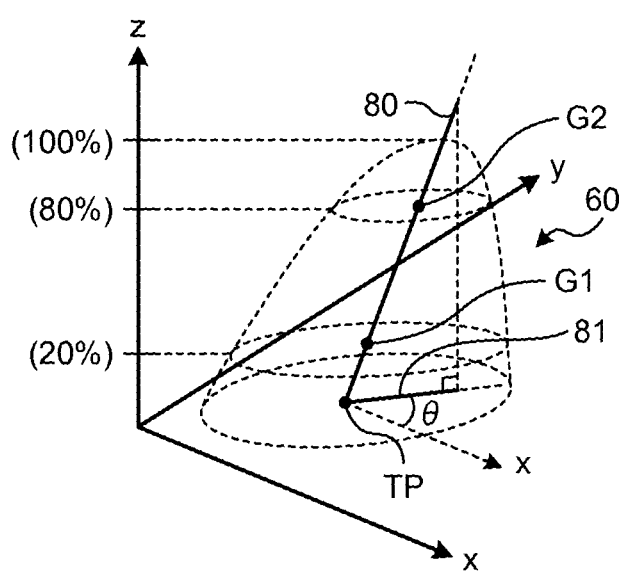
FIG. 22 is an explanatory view illustrating a straight line connecting between the barycenter based on a first threshold value and the barycenter based on a second threshold value, and a target point.

FIG. 19 is a view illustrating three-dimensional waveforms detected corresponding to each axial angle of the finger when the finger is in contact with or in close proximity to the display unit with a touch detection function according to the first embodiment of the present disclosure. FIG. 20 is an explanatory view illustrating a volume barycenter of the three-dimensional waveform portion that is equal to or greater than a first threshold value. FIG. 21 is an explanatory view illustrating a volume barycenter of the three-dimensional waveform portion that is equal to or greater than a second threshold value. Further, FIG. 22 is an explanatory view illustrating a straight line connecting between the barycenter based on the first threshold value and the barycenter based on the second threshold value, and a target point.

As illustrated in FIG. 19, the coordinate extracting unit 45 sections the three-dimensional waveform of the derived signal values at the first threshold value and the second threshold value which each have a predetermined ratio to the maximum signal value of the three-dimensional waveform. More specifically, the coordinate extracting unit 45 sections the three-dimensional waveform with a plane parallel to the xy plane and having a z-axis value equal to the first threshold value and a plane parallel to the xy plane and having a z-axis value equal to the second threshold value. Each of the first threshold value and the second threshold value may be a value of any ratio to the maximum signal value; for example, the first threshold value may be less than the second threshold value, with the first threshold value being 20% the maximum signal value of the three-dimensional waveform and the second threshold value being 80% the maximum value. FIG. 19 illustrates a three-dimensional waveform 61a with the axial direction of the finger 50 tilted rightward when viewed from the front side of the sheet of FIG. 19, a three-dimensional waveform 61b with the axial direction of the finger 50 oriented substantially in a perpendicular direction, a three-dimensional waveform 61c with the axial direction of the finger 50 tilted leftward when viewed from the front side of the sheet of FIG. 19, and each of the three-dimensional waveforms being sectioned at the first threshold value and the second threshold value.

Next, as illustrated in FIG. 20, the coordinate extracting unit 45 sections the derived three-dimensional waveform 60 at the first threshold value and calculates a volume barycenter G1a. The volume barycenter G1a is the barycenter of the volume of a three-dimensional waveform portion 60a that is a portion of the three-dimensional waveform equal to or greater than the first threshold value. Then, the coordinate extracting unit 45 calculates a point to which the volume barycenter G1a is projected on a section 90a of the three-dimensional waveform portion 60a sectioned at the first threshold value, that is, the intersection between the normal from the volume barycenter G1a to the section 90a and the section 90a. The resulting intersection is defined as the "barycenter G1," for the sake of convenience.

In the same manner, as illustrated in FIG. 21, the coordinate extracting unit 45 sections the three-dimensional waveform 60 at the second threshold value and calculates a volume barycenter G2a. The volume barycenter G2a is the barycenter of the volume of a three-dimensional waveform portion 60b that is a portion of the three-dimensional waveform equal to or greater than the second threshold value. Then, the coordinate extracting unit 45 calculates a point to which the volume barycenter G2a is projected on a section 90b of the three-dimensional waveform portion 60b sectioned at the second threshold value, that is, the intersection between the normal from the volume barycenter G2a to the section 90b and the section 90b. The resulting intersection is defined as the "barycenter G2."

Then, as illustrated in FIG. 22, the coordinate extracting unit 45 derives a straight line 80 connecting between the barycenter G1 calculated based on the first threshold value and the barycenter G2 calculated based on the second threshold value, and determines that the straight line 80 is in the axial direction of the finger 50 (pointer). The coordinate extracting unit 45 derives the intersection between the straight line 80 and an x-y plane at z=0, and determines that the coordinates (x-y coordinates) of this intersection are the coordinates of a target point TP (pointed coordinates) that is considered to be the contact point or proximity point intended by a user on the screen of the display unit with a touch detection function 10. The coordinate extracting unit 45 outputs the derived coordinate data of the target point TP and the axial data (the straight line 80) of the finger 50 (pointer) as the output signal Out, and outputs the coordinate data to the control unit 11 to which the video signal Vdisp is supplied. Then, the control unit 11 executes the display operation in accordance with the coordinate data.

As described above, the display device with a touch detection function 1 according to the present embodiment does not derive three values based on the derived signal values as disclosed in JP-A-2010-55510 described above but derives the axial direction of the pointer based on the three-dimensional waveform to which each of the signal values in a region where a touch is detected is reflected, and then derives the coordinates of the target point TP. Thus, the display device with a touch detection function 1 can consider the derived straight line 80 to be the actual axial direction of the pointer and can approximate the coordinates of the target point TP derived based on the axial direction to the contact point or proximity point intended by a user. Thus, when compared with the deriving three values as disclosed in JP-A-2010-55510, it is possible to provide improved control accuracy to the touch operation by a user on the screen.

The display device with a touch detection function 1 according to the present embodiment employs, as threshold values, not predetermined fixed threshold values but values each being a predetermined ratio to the maximum value of the signal values in a three-dimensional waveform based on the signal value in a region where a touch is detected. Thus, the display device with a touch detection function 1 can derive the axial direction of the pointer and the coordinates of the target point TP in any direction of the pointer (such as the finger 50) with values of predetermined ratios to the maximum value of the signal values being threshold values. For example, of the three-dimensional waveforms illustrated in FIG. 18, it is possible to derive the axial direction of the pointer and the coordinates of the target point TP for the three-dimensional waveform 64a (64b) that has smaller signal values when compared with the other three-dimensional waveforms.

It should be noted that as described above, the coordinate extracting unit 45 is configured to derive a three-dimensional waveform only by the signal value at each of the coordinates at which a touch is detected; however, present embodiment is not limited thereto. That is, when a touch is detected at particular coordinates by the signal processing unit 44, the coordinate extracting unit 45 may also derive a three-dimensional waveform by deriving a signal value in the vicinity of the coordinates at which the touch is detected. That is, it is not necessary for a touch to be detected at all the coordinates that correspond to the signal values that constitute a three-dimensional waveform, but may be sufficient for a touch to be detected at least at some of the coordinates that correspond to the signal values that constitute the three-dimensional waveform.

The coordinate extracting unit 45 is configured to determine that the straight line 80 connecting between the barycenter G1 and the barycenter G2 is the axial direction of the pointer; however, present embodiment is not limited thereto. It may also be determined that a straight line connecting between the volume barycenter G1a and the volume barycenter G2a is the axial direction of the pointer.

Since the greater the aforementioned number of divisions of the blocks A1 to An during the touch detection period Pt, the better the derivable resolution of the coordinates of the target point TP becomes, it is possible to derive coordinates with improved accuracy.

Rotational Operation of Display Image During the Touch Detection Period Pt

Figure 23:
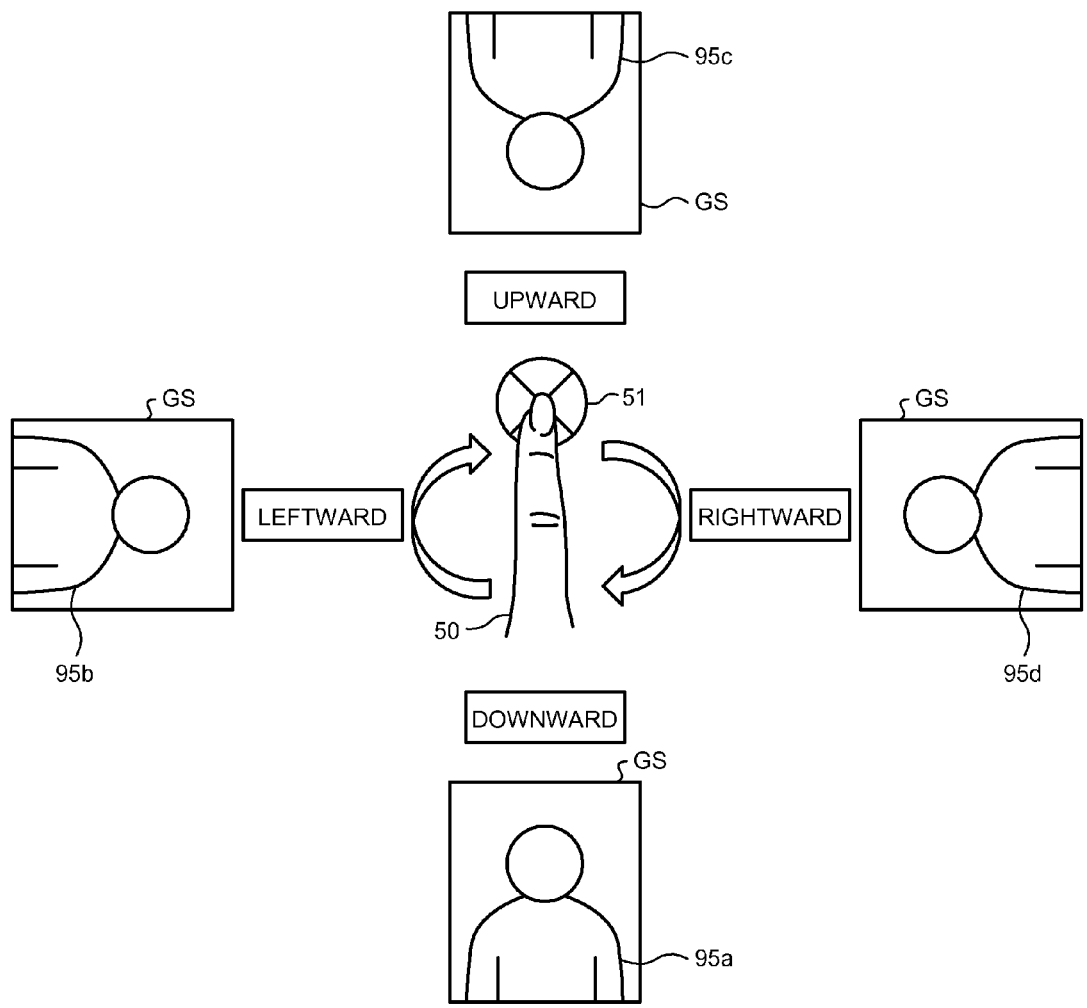
FIG. 23 is a view illustrating the operation of an image being rotated as the axial direction of a finger is rotated at a touch point on the display unit with a touch detection function according to the first embodiment of the present disclosure.

FIG. 23 is a view illustrating the operation of an image being rotated as the axial direction of a finger is rotated at a touch point on the display unit with a touch detection function according to the first embodiment of the present disclosure. With reference to FIG. 23, a description will be made to the operation of an image displayed on the screen GS being rotated when the axial direction of the finger 50 is rotated at the touch point 51 on the display unit with a touch detection function 10. The operation of rotating the axial direction of the finger 50 at the touch point 51 is the same as the operation described in relation to FIG. 17.

As described above, the coordinate extracting unit 45 outputs, as the output signal Out, the coordinate data of the target point TP and the axial data of the finger 50 (pointer) (the straight line 80 illustrated in FIG. 22), and outputs the axial data to the control unit 11 to which the video signal Vdisp is supplied. The control unit 11 determines a projected line 81 of the straight line 80 onto the xy plane from the axial data (the straight line 80) supplied from the coordinate extracting unit 45 and calculates an angle θ that the projected line 81 starting from the target point TP forms with the positive direction of the x-axis. Then, the control unit 11 rotates to an angle corresponding to the calculated angle θ and displays a display image to be displayed on the screen GS based on the video signal Vdisp. It should be noted that the angle θ is defined with respect to the positive direction of the x-axis; however, present embodiment is not limited thereto.

For example, when the base of the finger 50 in the axial direction of the finger 50 is oriented downward as illustrated in FIG. 23, the angle θ formed between the projected line of the axial direction of the finger 50 and the positive direction of the x-axis is such that θ=270° (−90°), allowing a display image 95a to be displayed at a typical angle on the screen GS. Next, when the finger 50 is displaced (gestured) so that the angle θ with respect to the axial direction of the finger 50 varies from θ=270° to θ=180° (leftward), the control unit 11 rotates the display image 95a displayed on the screen GS by 90° in a clockwise direction so as to display a display image 95b. Next, when the finger 50 is displaced (gestured) so that the angle θ with respect to the axial direction of the finger 50 varies from θ=180° to θ=90° (upward), the control unit 11 rotates the display image 95b displayed on the screen GS by 90° in a clockwise direction so as to display a display image 95c. Next, when the finger 50 is displaced (gestured) so that the angle θ with respect to the axial direction of the finger 50 varies from θ=90° to θ=0° (rightward), the control unit 11 rotates the display image 95c displayed on the screen GS by 90° in a clockwise direction so as to display a display image 95d. Then, when the finger 50 is displaced (gestured) so that the angle θ with respect to the axial direction of the finger 50 varies from θ=0° to θ=270° (−90°) (downward), the control unit 11 rotates the display image 95d displayed on the screen GS by 90° in a clockwise direction so as to display the display image 95a at the typical angle.

The aforementioned operations have been illustrated as an example of the operation of rotating, by one turn in a clockwise direction, a display image displayed on the screen GS. As a matter of course, it is also possible to rotate the display image in a counterclockwise direction or by an arbitrary angle in an arbitrary direction depending on the axial direction of the pointer.

As described above, the display device with a touch detection function 1 according to the present embodiment determines a projected line from the derived axial data of the pointer and rotates the display image displayed on the screen GS depending on a variation in the angle of the projected line caused by the gesture of the pointer. That is, the display device with a touch detection function 1 can rotate a display image by an arbitrary angle in an arbitrary direction depending on the axial direction of one pointer and display the resulting image, so that the rotational angle of the display image will never be physically restricted by one gesture.

It should be noted that as described above, the control unit 11 is configured to determine a projected line based on the axial data supplied from the coordinate extracting unit 45 and calculate the angle θ that is formed between the projected line and the positive direction of the x-axis; present embodiment is not limited thereto. That is, the coordinate extracting unit 45 of the touch detection unit 40 may also calculate the angle θ based on the derived axial data and output the data of the angle θ to the control unit 11.

The rotational operation of the display image followed by the rotational operation (gesture) of the axial direction of the pointer has not to be employed at any time, but may be employed only when a display image is displayed in a predetermined screen display condition that requires the image to be rotated (for example, when captured image data is displayed on the screen).

The display image is rotated following by the rotational operation (gesture) of the axial direction of the pointer; however, the display video image may also be rotated.

Modification

Figure 24:
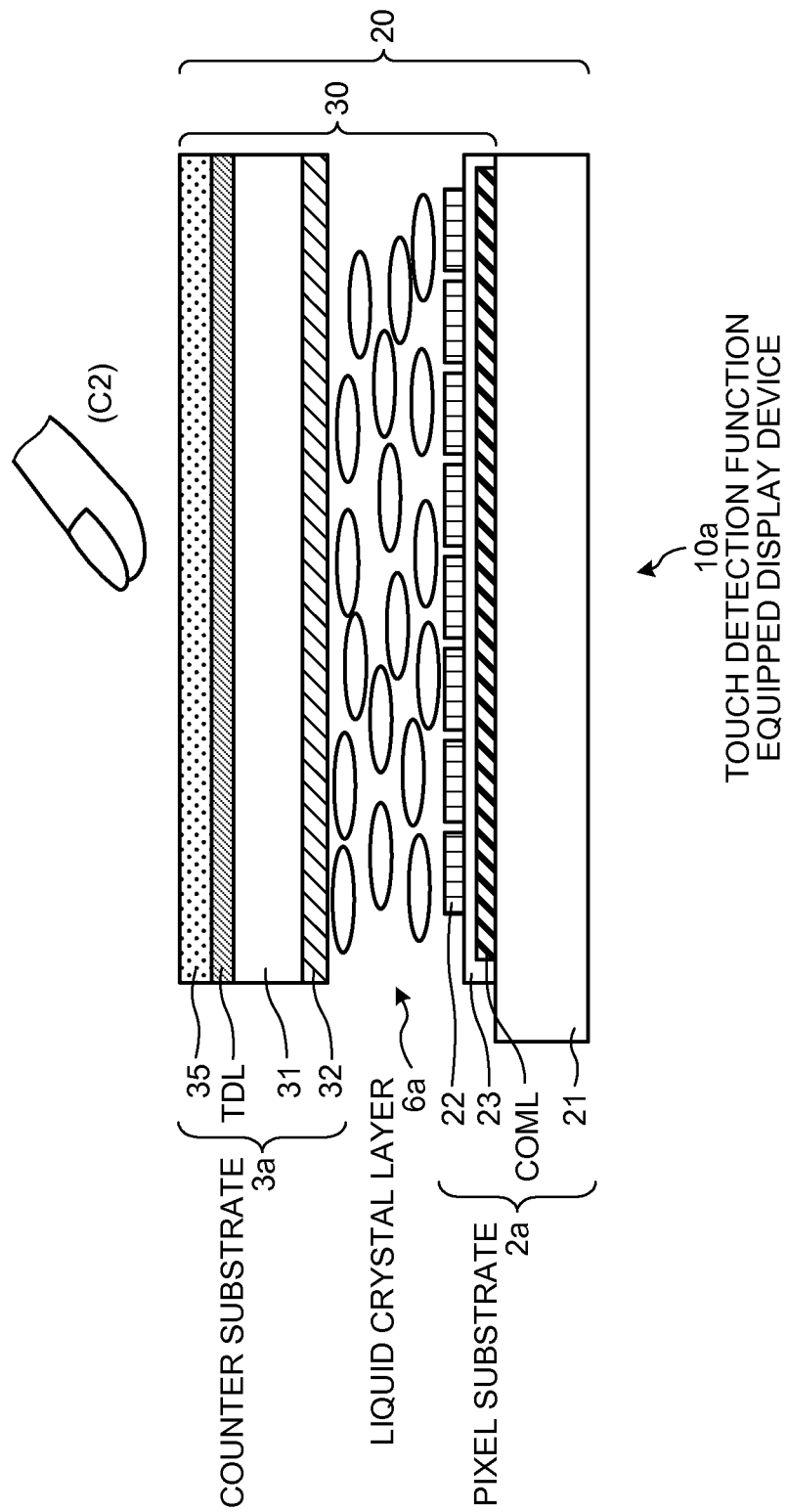
FIG. 24 is a schematic cross-sectional view illustrating a display unit with a touch detection function according to a modification of the first embodiment of the present disclosure.

FIG. 24 is a schematic cross-sectional view illustrating a display unit with a touch detection function according to a modification of the first embodiment of the present disclosure.

The display unit with a touch detection function 10 of the aforementioned display device with a touch detection function 1 employs, for example, the TN mode, the VA mode, or the OCB mode as the system for driving the liquid crystal layer 6. Instead of these mode, it is also possible to employ a horizontal electric field mode system for driving liquid crystal like the display unit with a touch detection function 10a illustrated in FIG. 24 of a display device with a touch detection function 1a (see FIG. 1). Employed as the horizontal electric field mode drive system is the in-plane switching (IPS) mode or the fringe field switching (FFS) mode. The display unit with a touch detection function 10a illustrated in FIG. 24 is constructed to sandwich a liquid crystal layer 6a between the pixel substrate 2a and the counter substrate 3a. Unlike the display unit with a touch detection function 10 illustrated in FIG. 7, the display unit with a touch detection function 10a is configured such that the drive electrodes COML serving for both the display operation and the touch detection operation are provided on the surface of the liquid crystal layer 6a side of the TFT substrate 21 so as to form part of the pixel substrate 2a. On the liquid crystal layer 6a side of the drive electrodes COML provided are the pixel electrodes 22 with an insulating layer 23 interposed therebetween. In this case, all the members, including the liquid crystal layer 6a, between the drive electrodes COML and the touch detection electrodes TDL contribute to the formation of the capacitive element C1. The liquid crystal layer 6a acts to modulate light passing therethrough depending on the status of the electric field. The structure and function of each of the other components are the same as those of the display unit with a touch detection function 10 illustrated in FIG. 7.

As described above, the arrangement of the display unit with a touch detection function 10a illustrated in FIG. 24 can provide the advantages achieved by the aforementioned embodiment.

It should be noted that the display unit with a touch detection function 10 illustrated in FIG. 7 and the display unit with a touch detection function 10a illustrated in FIG. 24 are of the so-called in-cell type in which the liquid crystal display unit 20 and the touch detection device 30 are integrated; however, present embodiment is not limited thereto. For example, such a structure may also be employed in which a capacitive touch detection device is attached to a liquid crystal display unit. In the case of this structure, the liquid crystal display unit 20 and the touch detection device 30 are constructed not to share the drive electrodes, but the liquid crystal display unit and the touch detection device are provided with respective drive electrodes (first drive electrodes and second drive electrodes). Even in this case, the aforementioned operation can be employed, thereby providing the same advantages. The aforementioned drive electrodes provided on the liquid crystal display unit correspond to "the first drive electrodes" of the present disclosure, and the drive electrodes provided on the touch detection device correspond to "the second drive electrodes" of the present disclosure.

2. Second Embodiment

Configuration of Electronic Apparatus

FIGS. 25 to 37 are views illustrating the configuration of an electronic apparatus according to the second embodiment of the present disclosure to which a display device with a touch detection function is applied. The display device with a touch detection function 1 and the display device with a touch detection function 1a according to the first embodiment are applicable to electronic apparatuses of any field such as a television set, a digital camera, a video camera, a notebook personal computer, a mobile telephone, and a personal digital assistant. That is, the display device with a touch detection function 1 and the display device with a touch detection function 1a according to the first embodiment are applicable to electronic apparatuses of any field that display, as an image or a video, an externally supplied video signal or an internally generated video signal. Such an electronic apparatus includes a controller which executes processing corresponding to the control detected by the display device with a touch detection function and which supplies a video signal to the display device with a touch detection function. With reference to FIGS. 25 to 37, a description will be made to the configuration of a specific electronic apparatus to which a display device with a touch detection function is applied.

Figure 25:
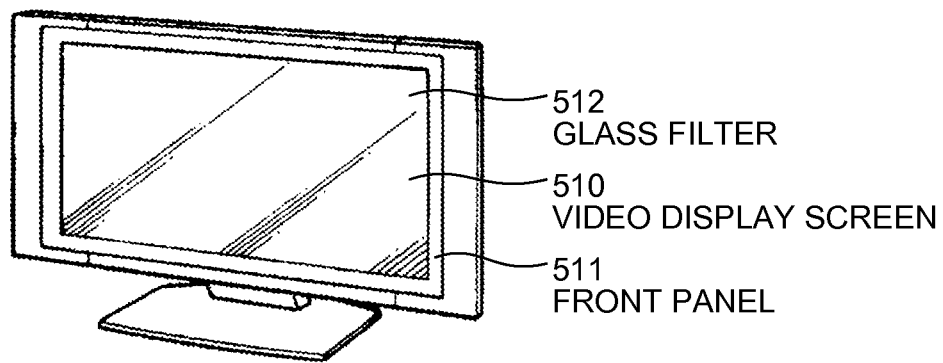
FIG. 25 is a view illustrating an example in which a display device with a touch detection function is incorporated into a television set serving as an electronic apparatus according to a second embodiment of the present disclosure.

FIG. 25 is a view illustrating an example in which a display device with a touch detection function is incorporated into a television set serving as an electronic apparatus according to the second embodiment of the present disclosure. The television set illustrated in FIG. 25 serving as an electronic apparatus has a video display screen 510 that includes a front panel 511 and a glass filter 512, the video display screen 510 being made up of the display device with a touch detection function 1 and the display device with a touch detection function 1a according to the first embodiment.

Figure 26:
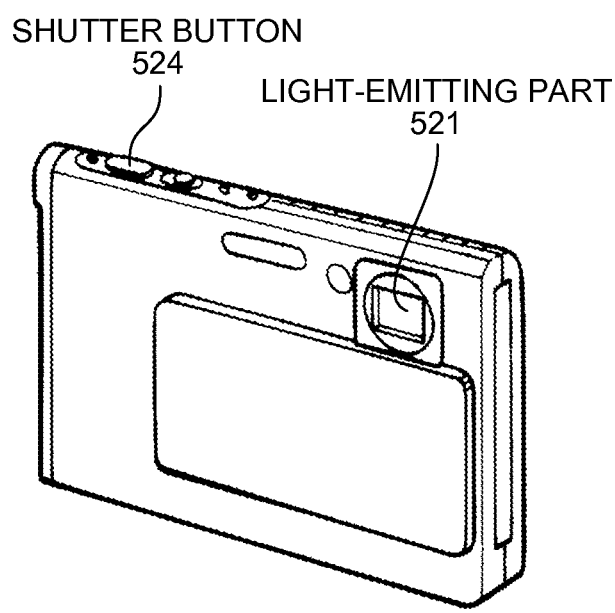
FIG. 26 is a view illustrating an example in which a display device with a touch detection function is incorporated into a digital camera serving as an electronic apparatus according to the second embodiment of the present disclosure, the digital camera being illustrated in a front perspective view.
Figure 27:
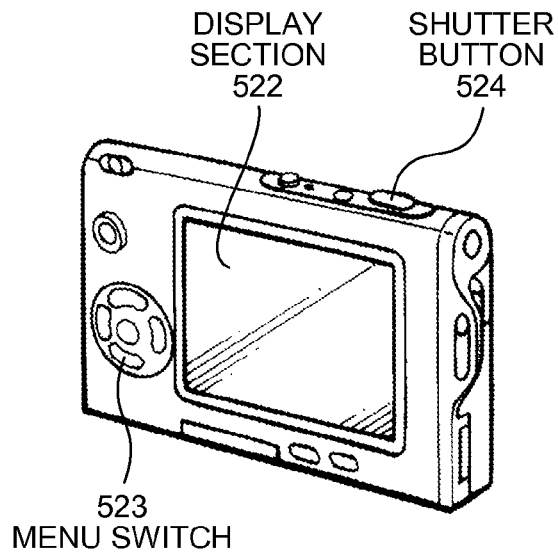
FIG. 27 is a view illustrating an example in which a display device with a touch detection function is incorporated into a digital camera serving as an electronic apparatus according to the second embodiment of the present disclosure, the digital camera being illustrated in a rear perspective view.

FIG. 26 is a view illustrating an example in which a display device with a touch detection function is incorporated into a digital camera serving as an electronic apparatus according to the second embodiment of the present disclosure, the digital camera being illustrating in a front perspective view. FIG. 27 is a rear perspective view illustrating the digital camera. The digital camera illustrated in FIG. 26 and FIG. 27 serving as an electronic apparatus has a flash light emitting part 521, a display section 522, a menu switch 523, and a shutter button 524, the display section 522 being made up of the display device with a touch detection function 1 and the display device with a touch detection function 1a according to the first embodiment.

Figure 28:
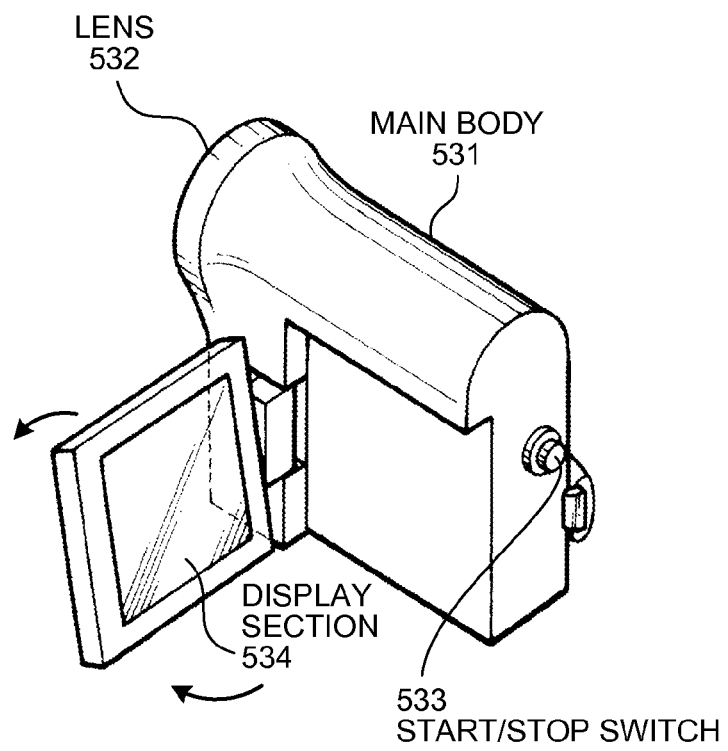
FIG. 28 is a view illustrating an example in which a display device with a touch detection function is incorporated into a video camera serving as an electronic apparatus according to the second embodiment of the present disclosure.

FIG. 28 is a view illustrating an example in which a display device with a touch detection function is incorporated into a video camera serving as an electronic apparatus according to the second embodiment of the present disclosure. The video camera illustrated in FIG. 28 serving as an electronic apparatus has a main body 531, a lens 532 provided on the front side of the main body 531 for capturing a subject image, a start/stop switch 533 for starting and stopping capturing images, and a display section 534. The display section 534 is made up of the display device with a touch detection function 1 and the display device with a touch detection function 1a according to the first embodiment.

Figure 29:
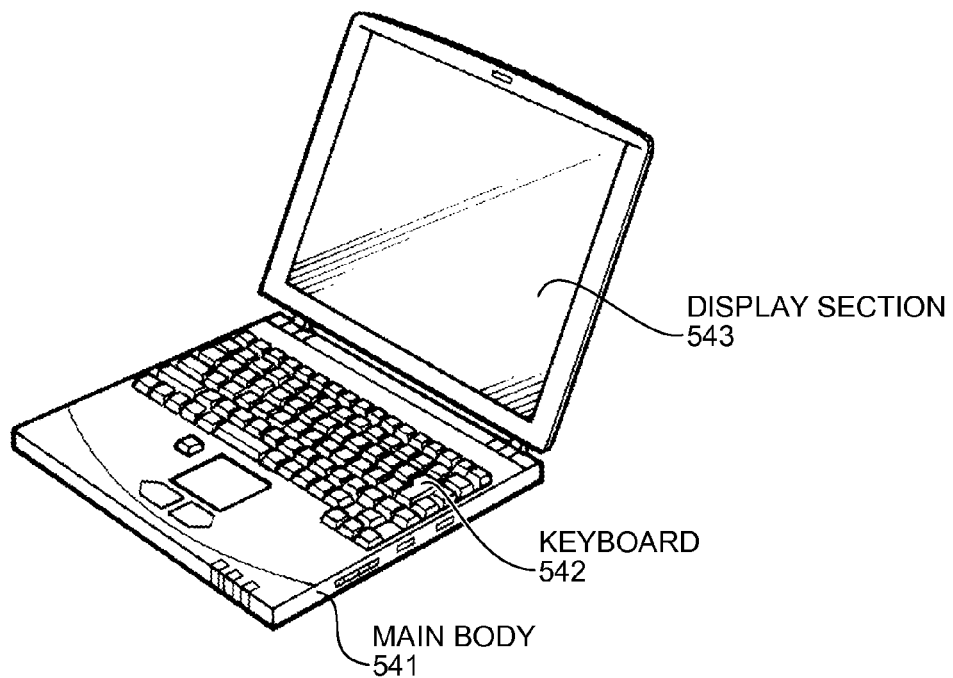
FIG. 29 is a view illustrating an example in which a display device with a touch detection function is incorporated into a notebook personal computer serving as an electronic apparatus according to the second embodiment of the present disclosure.

FIG. 29 is a view illustrating an example in which a display device with a touch detection function is incorporated into a notebook personal computer serving as an electronic apparatus according to the second embodiment of the present disclosure. The notebook personal computer illustrated in FIG. 29 serving as an electronic apparatus has a main body 541, a keyboard 542 for entering characters or the like, and a display section 543 for displaying images. The display section 543 is made up of the display device with a touch detection function 1 and the display device with a touch detection function 1a according to the first embodiment.

Figure 30:
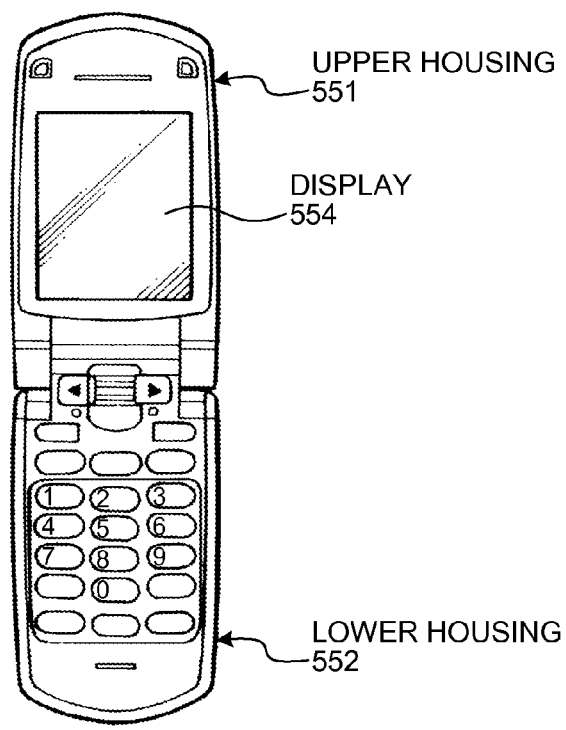
FIG. 30 is a view illustrating an example in which a display device with a touch detection function is incorporated into a mobile telephone serving as an electronic apparatus according to the second embodiment of the present disclosure, the mobile telephone being illustrated in a front view with the upper housing and the lower housing opened.
Figure 31:
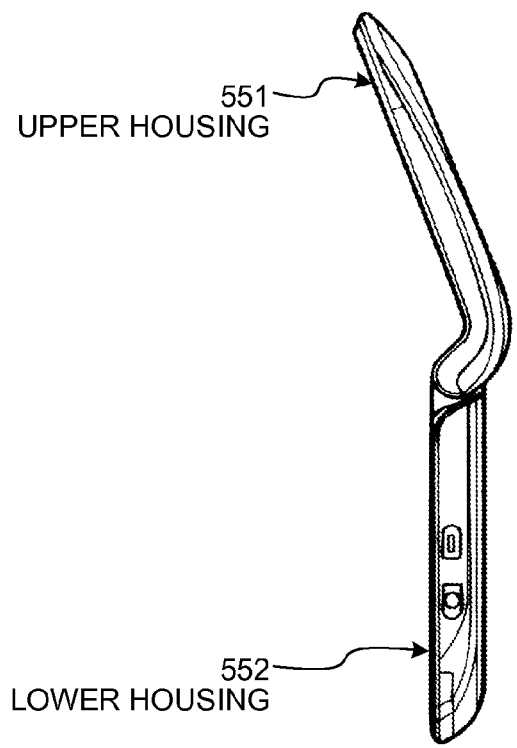
FIG. 31 is a view illustrating an example in which a display device with a touch detection function is incorporated into a mobile telephone serving as an electronic apparatus according to the second embodiment of the present disclosure, the mobile telephone being illustrated in a side view with the upper housing and the lower housing opened.
Figure 32:
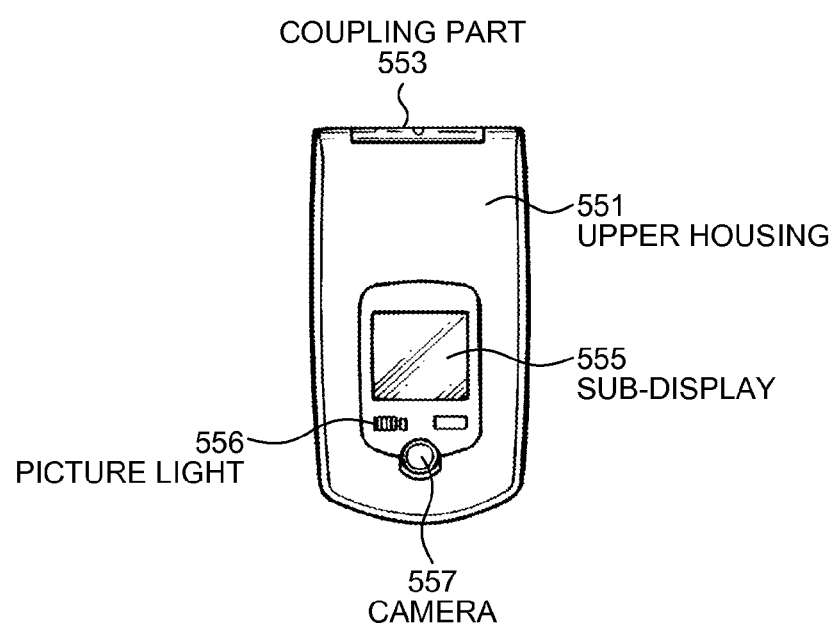
FIG. 32 is a view illustrating an example in which a display device with a touch detection function is incorporated into a mobile telephone serving as an electronic apparatus according to the second embodiment of the present disclosure, the mobile telephone being illustrated in a front view with the upper housing and the lower housing closed.
Figure 33:
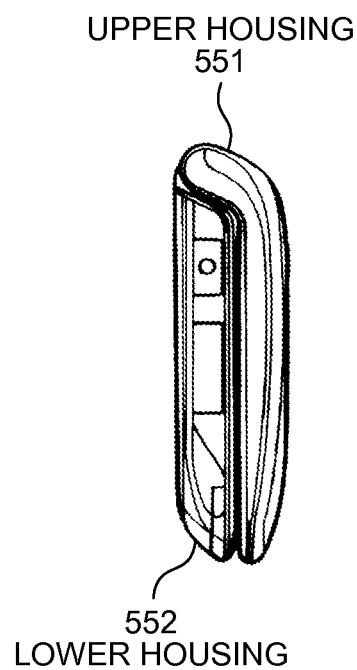
FIG. 33 is a view illustrating an example in which a display device with a touch detection function is incorporated into a mobile telephone serving as an electronic apparatus according to the second embodiment of the present disclosure, the mobile telephone being illustrated in a left side view with the upper housing and the lower housing closed.
Figure 34:
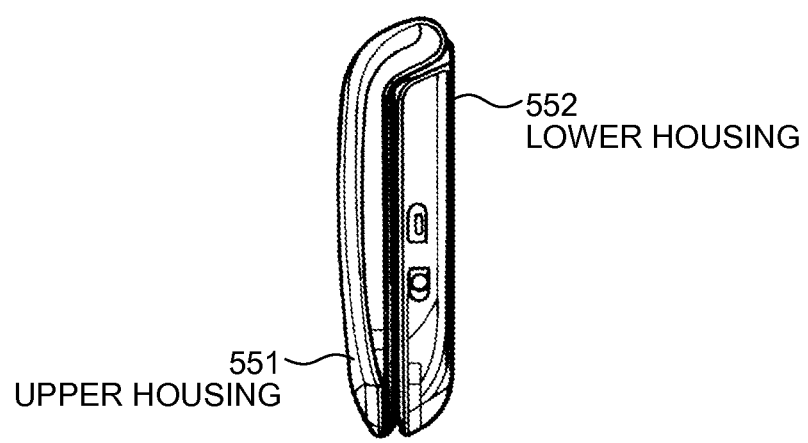
FIG. 34 is a view illustrating an example in which a display device with a touch detection function is incorporated into a mobile telephone serving as an electronic apparatus according to the second embodiment of the present disclosure, the mobile telephone being illustrated in a right side view with the upper housing and the lower housing closed.
Figure 35:
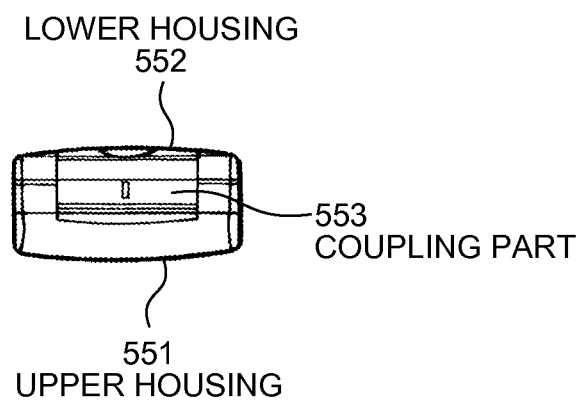
FIG. 35 is a view illustrating an example in which a display device with a touch detection function is incorporated into a mobile telephone serving as an electronic apparatus according to the second embodiment of the present disclosure, the mobile telephone being illustrated in a side view of the connecting part with the upper housing and the lower housing closed.
Figure 36:
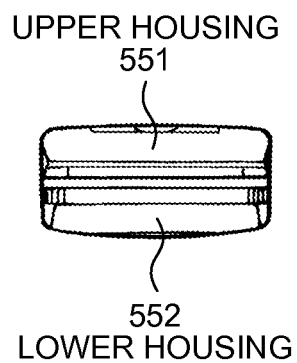
FIG. 36 is a view illustrating an example in which a display device with a touch detection function is incorporated into a mobile telephone serving as an electronic apparatus according to the second embodiment of the present disclosure, the mobile telephone being illustrated in a side view of the open/close part with the upper housing and the lower housing closed.

FIG. 30 is a view illustrating an example in which a display device with a touch detection function is incorporated into a mobile telephone serving as an electronic apparatus according to the second embodiment of the present disclosure, the mobile telephone being illustrated in a front view with the upper housing and the lower housing opened. FIG. 31 is a side view illustrating the mobile telephone with the upper housing and the lower housing opened. Further, FIGS. 32 to 36 are views of the mobile telephone with the upper housing and the lower housing closed, illustrating the mobile telephone in a front view, a left side view, a right side view, a side view of the connecting part, and a side view of the open/close part, respectively. The mobile telephone illustrated in FIG. 30 to FIG. 36 serving as an electronic apparatus has an upper housing 551 and a lower housing 552 coupled to each other by a connecting part 553, a display 554, a sub-display 555, a picture light 556, and a camera 557. The display 554 or the sub-display 555 are made up of the display device with a touch detection function 1 and the display device with a touch detection function 1a according to the first embodiment.

Figure 37:
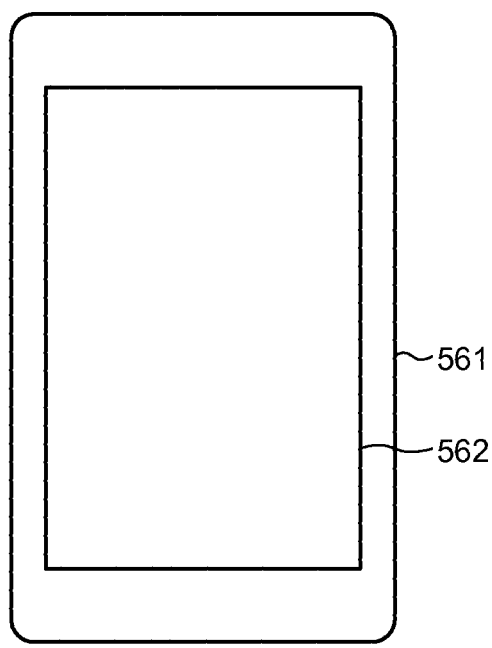
FIG. 37 is a view illustrating an example in which a display device with a touch detection function is incorporated into a personal digital assistant serving as an electronic apparatus according to the second embodiment of the present disclosure.

FIG. 37 is a view illustrating an example in which a display device with a touch detection function is incorporated into a personal digital assistant serving as an electronic apparatus according to the second embodiment of the present disclosure. The personal digital assistant illustrated in FIG. 37 serving as an electronic apparatus is referred to as the so-called smartphone or tablet terminal which operates as a portable computer, a multi-functional mobile telephone, a portable computer capable of voice calls, or a portable computer capable of communication. This personal digital assistant has a housing 561 and a display section 562 disposed on the surface of the housing. The display section 562 is made up of the display device with a touch detection function 1 and the display device with a touch detection function 1a according to the first embodiment.

The embodiments of the present disclosure are not limited by the foregoing descriptions. Further, the components in the above described embodiments include components easily conceivable by those skilled in the art and components substantially identical, in other words, components that are within the range of equivalency.

3. Aspects of Present Disclosure

The present disclosure includes the following aspects.
(1) A touch detection device comprising:
  a plurality of touch detection electrodes;
  a plurality of drive electrodes opposed to the touch detection electrodes and forming capacitance between the drive electrodes and the touch detection electrodes;
  an operation drive unit for applying a touch detection drive signal to the drive electrodes during a touch detection operation to detect whether a pointer is in contact with or in proximity to the device; and
  a touch detection unit for detecting a touch detection signal appearing on the touch detection electrodes by the touch detection drive signal, wherein
  when the pointer is detected to be in contact with or in proximity to the device during the touch detection operation carried out based on the touch detection signal detected from the touch detection electrodes,
    the touch detection unit:
    derives a signal value based on the touch detection signal at coordinates at which the pointer is in contact with or in proximity to the device and in the vicinity of the coordinates;
    derives a three-dimensional waveform which employs a magnitude of the signal value as a height direction;
    derives a straight line in the three-dimensional waveform, the straight line connecting between a barycenter based on a volume of a three-dimensional waveform portion equal to or greater than a first threshold value in the height direction and a barycenter based on a volume of a three-dimensional waveform portion equal to or greater than a second threshold value different from the first threshold value in the height direction; and
    detects based on the straight line whether the pointer is in contact with or in proximity to the device.
(2) The touch detection device according to claim 1, wherein the touch detection unit determines that the straight line is an axial direction of the pointer.
(3) The touch detection device according to claim 1, wherein during the touch detection operation, the touch detection unit defines coordinates of a point, at which the straight line intersects a plane having a generally zero length in the height direction and being perpendicular to the height direction, as pointed coordinates of a contact point or proximity point of the pointer.
(4) The touch detection device according to claim 1, wherein the first threshold value and the second threshold value each have a predetermined ratio to the maximum value of signal values constituting the three-dimensional waveform.
(5) The touch detection device according to claim 1, wherein
  the barycenter based on the volume of the three-dimensional waveform portion equal to or greater than the first threshold value is defined as a point, the point being obtained by projecting, in the height direction, a volume barycenter of a three-dimensional waveform portion equal to or greater than the first threshold value, onto a section obtained by cutting the three-dimensional waveform with a plane, the plane having a magnitude of the first threshold value in the height direction and being perpendicular to the height direction; and
  the barycenter of the volume of the three-dimensional waveform portion equal to or greater than the second threshold value is defined as a point, the point being obtained by projecting, in the height direction, a volume barycenter of the three-dimensional waveform portion equal to or greater than the second threshold value, onto a section obtained by cutting the three-dimensional waveform with a plane, the plane having a magnitude of the second threshold value in the height direction and being perpendicular to the height direction.
(6) The touch detection device according to claim 1, wherein the barycenter based on the volume of the three-dimensional waveform portion is defined as the volume barycenter of the volume.

(7) The touch detection device according to claim 1, wherein during the touch detection operation, the touch detection unit employs, as the signal value, a difference between a value based on the touch detection signal detected on the touch detection electrodes when the pointer is neither in contact with nor in close proximity to the device, and, a value based on the touch detection signal detected on the touch detection electrodes when the pointer is in contact with or in proximity to the device.

(8) A display device with a touch detection function comprising:
the touch detection device according to claim 1;
a plurality of pixel electrodes to which a pixel signal is applied for a pixel to perform a display operation;
a display drive unit for applying the pixel signal to the pixel electrodes so as to carry out the display operation; and
a control unit for controlling the operation drive unit and the display drive unit, wherein
during the display operation, the operation drive unit applies a display drive signal in synchronization with the pixel signal to the drive electrodes.

(9) The display device with a touch detection function according to claim 8, wherein during the touch detection operation, the control unit rotates an image or a video image depending on the direction of the straight line derived by the touch detection unit, the image or the video image being displayed in the display operation.

(10) The display device with a touch detection function according to claim 9, wherein
during the touch detection operation, the control unit determines a projected line of the straight line on a plane perpendicular to the height direction, the straight line being derived by the touch detection unit; and
the image or the video image displayed in the display operation is rotated depending on an angle from a reference position of the projected line started from the pointed coordinates.

(11) The display device with a touch detection function according to claim 8, wherein the drive electrodes have first drive electrodes to which the display drive signal is applied during the display operation, and second drive electrodes to which the touch detection drive signal is applied during the touch detection operation.

(12) The display device with a touch detection function according to claim 8, wherein the control unit alternately repeats a display operation period in which the display operation is carried out and a touch detection period in which the touch detection operation is carried out.

(13) An electronic apparatus comprising:
the display device with a touch detection function according to claim 8; and
a controller for carrying out processing associated with control detected by the display device with a touch detection function and supplying a video signal to the display device with a touch detection function.

The display device with a touch detection function according to the present disclosure and an electronic apparatus including the same can determine the contact point or proximity point intended by a user on the screen with high accuracy, and prevent user's erroneous operations on the touch panel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch detection device comprising:
a plurality of touch detection electrodes;
a plurality of drive electrodes opposed to the touch detection electrodes and forming capacitance between the drive electrodes and the touch detection electrodes;
an operation drive unit for applying a touch detection drive signal to the drive electrodes during a touch detection operation to detect whether a pointer is in contact with or in proximity to the device; and
a touch detection unit for detecting a touch detection signal appearing on the touch detection electrodes by the touch detection drive signal, wherein
when the pointer is detected to be in contact with or in proximity to the device during the touch detection operation carried out based on the touch detection signal detected from the touch detection electrodes,
the touch detection unit:
derives a signal value based on the touch detection signal at coordinates at which the pointer is in contact with or in proximity to the device and in the vicinity of the coordinates;
derives a three-dimensional waveform which employs a magnitude of the signal value as a height direction;
derives a straight line in the three-dimensional waveform, the straight line connecting between a barycenter based on a volume of a three-dimensional waveform portion equal to or greater than a first threshold value in the height direction and a barycenter based on a volume of a three-dimensional waveform portion equal to or greater than a second threshold value different from the first threshold value in the height direction; and
detects based on the straight line whether the pointer is in contact with or in proximity to the device.

2. The touch detection device according to claim 1, wherein the touch detection unit determines that the straight line is an axial direction of the pointer.

3. The touch detection device according to claim 1, wherein during the touch detection operation, the touch detection unit defines coordinates of a point, at which the straight line intersects a plane having a generally zero length in the height direction and being perpendicular to the height direction, as pointed coordinates of a contact point or proximity point of the pointer.

4. The touch detection device according to claim 1, wherein the first threshold value and the second threshold value each have a predetermined ratio to the maximum value of signal values constituting the three-dimensional waveform.

5. The touch detection device according to claim 1, wherein
the barycenter based on the volume of the three-dimensional waveform portion equal to or greater than the first threshold value is defined as a point, the point being obtained by projecting, in the height direction, a volume barycenter of a three-dimensional waveform portion equal to or greater than the first threshold value, onto a section obtained by cutting the three-dimensional waveform with a plane, the plane having a magnitude of the first threshold value in the height direction and being perpendicular to the height direction; and
the barycenter of the volume of the three-dimensional waveform portion equal to or greater than the second threshold value is defined as a point, the point being obtained by projecting, in the height direction, a volume barycenter of the three-dimensional waveform portion equal to or greater than the second threshold value, onto a section obtained by cutting the three-dimensional waveform with a plane, the plane having a magnitude of the second threshold value in the height direction and being perpendicular to the height direction.

6. The touch detection device according to claim 1, wherein the barycenter based on the volume of the three-dimensional waveform portion is defined as the volume barycenter of the volume.

7. The touch detection device according to claim 1, wherein during the touch detection operation, the touch detection unit employs, as the signal value, a difference between a value based on the touch detection signal detected on the touch detection electrodes when the pointer is neither in contact with nor in close proximity to the device, and, a value based on the touch detection signal detected on the touch detection electrodes when the pointer is in contact with or in proximity to the device.

8. A display device with a touch detection function comprising:
   the touch detection device according to claim 1;
   a plurality of pixel electrodes to which a pixel signal is applied for a pixel to perform a display operation;
   a display drive unit for applying the pixel signal to the pixel electrodes so as to carry out the display operation; and
   a control unit for controlling the operation drive unit and the display drive unit, wherein
   during the display operation, the operation drive unit applies a display drive signal in synchronization with the pixel signal to the drive electrodes.

9. The display device with a touch detection function according to claim 8, wherein during the touch detection operation, the control unit rotates an image or a video image depending on the direction of the straight line derived by the touch detection unit, the image or the video image being displayed in the display operation.

10. The display device with a touch detection function according to claim 9, wherein
    during the touch detection operation, the control unit determines a projected line of the straight line on a plane perpendicular to the height direction, the straight line being derived by the touch detection unit; and
    the image or the video image displayed in the display operation is rotated depending on an angle from a reference position of the projected line started from the pointed coordinates.

11. The display device with a touch detection function according to claim 8, wherein the drive electrodes have first drive electrodes to which the display drive signal is applied during the display operation, and second drive electrodes to which the touch detection drive signal is applied during the touch detection operation.

12. The display device with a touch detection function according to claim 8, wherein the control unit alternately repeats a display operation period in which the display operation is carried out and a touch detection period in which the touch detection operation is carried out.

13. An electronic apparatus comprising:
    the display device with a touch detection function according to claim 8; and
    a controller for carrying out processing associated with control detected by the display device with a touch detection function and supplying a video signal to the display device with a touch detection function.

\* \* \* \* \*